US011443623B1

(12) United States Patent
Ratrout et al.

(10) Patent No.: US 11,443,623 B1
(45) Date of Patent: Sep. 13, 2022

(54) REAL TIME TRAFFIC CRASH SEVERITY PREDICTION TOOL

(71) Applicant: KING FAHD UNIVERSITY OF PETROLEUM AND MINERALS, Dhahran (SA)

(72) Inventors: Nedal Ratrout, Dhahran (SA); Umer Mansoor, Dhahran (SA); Gulzar Alam, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/717,648

(22) Filed: Apr. 11, 2022

(51) Int. Cl.
*G01C 21/34* (2006.01)
*G08G 1/0967* (2006.01)

(52) U.S. Cl.
CPC .................................. *G08G 1/0967* (2013.01)

(58) Field of Classification Search
CPC .................................................... G08G 1/0967
See application file for complete search history.

(56) References Cited

U.S. PATENT DOCUMENTS

| | | | | |
|---|---|---|---|---|
| 8,880,296 | B2 | 11/2014 | Breed | |
| 2016/0061625 | A1* | 3/2016 | Wang | G01C 21/3697 701/454 |
| 2018/0299284 | A1* | 10/2018 | Wang | G01C 21/3694 |
| 2021/0343149 | A1 | 11/2021 | Peng et al. | |

FOREIGN PATENT DOCUMENTS

| | | | |
|---|---|---|---|
| CN | 109598929 | * 11/2018 | G06Q 50/26 |
| CN | 109034264 A | 12/2018 | |
| CN | 109711704 | * 12/2018 | G06Q 10/06 |
| CN | 110867076 | * 11/2019 | G06F 16/29 |

(Continued)

OTHER PUBLICATIONS

Ling Wang, et al., "Predicting Crashes on Expressway Ramps with Real-Time Traffic and Weather Data", Transportation Research Record: Journal of the Transportation Research Board, vol. 2514, Issue 1, Jan. 1, 2015, pp. 32-38.

(Continued)

*Primary Examiner* — Hongmin Fan
(74) *Attorney, Agent, or Firm* — Oblon, McClelland, Maier & Neustadt, L.L.P.

(57) ABSTRACT

A crash severity prediction tool for use with a vehicle. The vehicle is equipped with a native crash severity prediction application and includes a user interface configured to receive a user destination, a GPS unit configured to generate location coordinates of the vehicle and a display configured to show a road map depicting roadways between a user start location and the user destination. The native crash severity computer application is communicably connected to a cloud based crash severity prediction computer application configured to receive the location coordinates and the road map. The cloud based application includes a trained artificial neural network (ANN) configured to predict a crash severity level based on real time weather conditions, light conditions, road surface conditions, and day of the week. A crash severity index is transmitted to the native crash severity prediction application and is rendered on a vehicle display.

20 Claims, 13 Drawing Sheets

(56) References Cited

FOREIGN PATENT DOCUMENTS

| | | | | |
|---|---|---|---|---|
| CN | 111915896 | * | 8/2020 | ............. G08G 1/017 |
| CN | 110956335 B | | 10/2020 | |
| CN | 114461624 | * | 1/2022 | ........... G06F 16/215 |
| DE | 102021122058 | * | 8/2021 | ......... G01C 21/3461 |
| WO | WO 2022109197 | * | 11/2021 | ............. G06Q 50/30 |

OTHER PUBLICATIONS

Athanasios Theofilatos, et al., “Comparing Machine Learning and Deep Learning Methods for Real-Time Crash Prediction”, Transportation Research Record (TRR), vol. 2673, Issue 8, Apr. 17, 2019, pp. 169-178.

* cited by examiner

400

REAL TIME TRAFFIC CRASH SEVERITY PREDICTION TOOL

BACKGROUND

Technical Field

The present disclosure is directed to traffic monitoring and particularly to a real time traffic crash severity prediction tool.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicle crashes are a major cause of fatalities globally. Factors related to human error, the vehicle, the roadway, and the environment may contribute to the severity of a crash. Several statistical and machine learning techniques have been employed for traffic crash severity prediction and for finding the significant factors contributing to crash severity. Conventional statistical techniques, such as logistic regression models, ordered models, and probit models, have been replaced by state-of-the-art machine learning techniques such as neural networks, random forest classification algorithms, and support vector machines to predict crash severity.

Research has been performed to understand the effect of variables related to human error, the vehicle and the environment on the severity of a traffic crash. This research has provided many insights. One insight from research indicated that traveling on a dry surface and two way roads leads to more severe crashes compared to wet road surface and one way roads [See: Garrido, R., Bastos, A., De Almeida, A. & Elvas, J. P. 2014, "Prediction of road accident severity using the ordered probit model," Transportation Research Procedia, 3, 214-223]. Another insight indicated that weather condition, characteristics of the road, and age and gender of the driver were found to be significant variables contributing to the crash severity [See: Jones, A. P. & Jørgensen, S. H. 2003, "The use of multilevel models for the prediction of road accident outcomes," Accident Analysis & Prevention, 35, 59-69]. Another insight revealed a relationship between recorded weather and crash severity which indicated that crashes are less severe in rainy conditions compared to normal weather conditions, and that the effect of foggy conditions on crash severity varies with geographical location [See: Edwards, J. B. 1998, "The relationship between road accident severity and recorded weather," Journal of Safety Research, 29, 249-262]. Another insight indicated that the time of day, the type of intersection and street lighting conditions significantly affected the severity of the traffic crash. It was also determined that crashes that occur in good street lighting conditions during peak hours are less severe than crashes occurring at night with no street lighting [See: Huang, H., Chin, H. C. & Hague, M. M. 2008, "Severity of driver injury and vehicle damage in traffic crashes at intersections: a Bayesian hierarchical analysis," Accident Analysis & Prevention, 40, 45-54]. Further, another insight indicated that lighting conditions, road surface conditions, road class, and road alignment significantly contributed to the outcome of a crash.

One insight indicated that higher traffic crash severity was associated with major arterials, curved locations, dry roadway surface, and nighttime without street lighting [See: Wang, Y. & Zhang, W. 2017, "Analysis of roadway and environmental factors affecting traffic crash severities," Transportation research procedia, 25, 2119-2125]. A different insight indicated that good weather conditions and darkness increase the severity of crashes for all types of vehicles[See: George, Y., Athanasios, T. & George, P. 2017, "Investigation of road accident severity per vehicle type," Transportation research procedia, 25, 2076-2083]. Also, from an insight obtained from using a random-effects generalized ordered probit model, it was concluded that darkness, rainy weather, and traffic volume lead to severe rollover crashes [See: Anarkooli, A. J., Hosseinpour, M. & Kardar, A. 2017, "Investigation of factors affecting the injury severity of single-vehicle rollover crashes: a random-effects generalized ordered probit model," Accident Analysis & Prevention, 106, 399-410]. A further insight indicated that roadway surface condition, driver conduct, vehicle action, driver restraint and driver age contributed significantly to the outcome of a crash [See: Li, Y., Ma, D., Zhu, M., Zeng, Z. & Wang, Y. 2018, "Identification of significant factors in fatal-injury highway crashes using genetic algorithm and neural network," Accident Analysis & Prevention, 111, 354-363]. Another insight indicated that street lighting conditions, time of the crash, and the age and gender of the driver significantly affect the crash severity for private vehicles, while for goods vehicles and motorcycle, the insight indicated that crashes were found to be more severe on weekdays [See: Yau, K. K. 2004, "Risk factors affecting the severity of single vehicle traffic accidents in Hong Kong," Accident Analysis & Prevention, 36, 333-340].

These insights may not be of use if they are not used for the prevention of crashes. Further, the references cited above do not provide these insights in an intuitive form and consumable form to support drivers in considering the safety of the roads and environment in making their travel plans. Accordingly, it is one object of the present disclosure to provide methods and systems for providing real time crash severity prediction of roadways on a display of the vehicle, which updates with changing environmental and road conditions.

SUMMARY

In an exemplary embodiment, a real time crash severity prediction system is disclosed. The real time crash severity prediction system includes a vehicle. The vehicle includes a user interface configured to receive a user destination, a GPS unit configured to generate location coordinates of the vehicle and show a road map depicting roadways between a user start location and the user destination, a display, a communications device, a computing device operatively connected to the GPS unit, the display and the communications device, the computing device including circuitry, a computer-readable medium configured to store first program instructions including a native crash severity computer application, and at least one first processor configured to execute the first program instructions, a crash severity prediction computer application communicably connected to the native crash severity computer application, the crash severity prediction computer application configured to receive the location coordinates and the road map, wherein the crash severity prediction computer application is operatively connected to cloud services including: a central processing unit including a memory configured to store the location coordinates and the road map, a set of vehicle display instructions, severity factors, and second program instructions, a street light database configured with street light records for each of the roadways, wherein the street light records indicate whether the street lights are lit or unlit, a weather forecast database configured with real time weather conditions including ambient light levels and real time road surface conditions at the location coordinates, wherein the central processing unit is configured to calculate a light condition at the location coordinates based on the street light records and the ambient light levels, a trained artificial neural network (ANN), wherein the trained artificial neural network is configured to predict a crash severity level based on the real time weather conditions, the light condition, the road surface conditions, a day of the week, and the severity factors, wherein the central processing unit is configured to calculate a crash severity index (CSI) from the crash severity level and transmit the crash severity index and the vehicle display instructions to the native crash severity computer application, and wherein the native crash severity computer application is configured to render the crash severity index on the display.

In another exemplary embodiment, a method for predicting real time crash severity is disclosed. The method includes receiving, at a user interface of a vehicle, a user destination, receiving, by a GPS unit of the vehicle, location coordinates of the vehicle, generating, by the GPS unit, a road map depicting roadways between a user start location and the user destination, transmitting, by a native crash severity computer application installed on a computing device of the vehicle, the location coordinates and the roadways to a cloud based crash severity prediction computer application, receiving, by the cloud based crash severity prediction computer application, the location coordinates and the roadways, accessing, from a memory of the cloud based crash severity prediction computer application, a set of vehicle display instructions and severity factors of the roadways, receiving, by the cloud based crash severity prediction computer application, street light records for each of the roadways from a street light database, wherein the street light records indicate whether the street lights are lit or unlit, receiving, by the cloud based crash severity prediction computer application, real time weather conditions including ambient light levels, and real time road surface conditions at the location coordinates from a weather forecast database, calculating, by a central processing unit of the cloud based crash severity prediction computer application, a light condition at the location coordinates based on the street light records and the ambient light levels, predicting, by a trained artificial neural network of the cloud based crash severity prediction computer application, a crash severity level based on the real time weather conditions, the light condition, the road surface conditions, a day of the week, and the severity factors, calculating, by the central processing unit, a crash severity index (CSI) from the crash severity level, transmitting the crash severity index and the vehicle display instructions to the native crash severity computer application, and rendering the crash severity index for the location coordinates on a vehicle display.

In another exemplary embodiment, a non-transitory computer readable medium having instructions stored therein that, when executed by one or more processors, cause the one or more processors to perform a method for predicting real time crash severity. The method includes receiving, at a user interface of a vehicle, a user destination, receiving, by a GPS unit of the vehicle, location coordinates of the vehicle, generating, by the GPS unit, a road map depicting roadways between a user start location and the user destination, transmitting, by a native crash severity computer application stored in the program instructions of the vehicle, the location coordinates and the roadways to a cloud based crash severity prediction computer application, receiving, by the cloud based crash severity prediction computer application, the location coordinates and the roadways, accessing, from a memory of the cloud based crash severity prediction computer application, a set of vehicle display instructions and severity factors of the roadways, receiving, by the cloud based crash severity prediction computer application, street light records for each of the roadways from a street light database, wherein the street light records indicate whether the street lights are lit or unlit, receiving, by the cloud based crash severity prediction computer application, real time weather conditions including ambient light levels, and real time road surface conditions at the location coordinates from a weather forecast database, calculating, by a central processing unit of the cloud based crash severity prediction computer application, a light condition at the location coordinates based on the street light records and the ambient light levels, predicting, by a trained artificial neural network of the cloud based crash severity prediction computer application, a crash severity level based on the real time weather conditions, the light condition, the road surface conditions, a day of the week, and the severity factors, calculating, by the central processing unit, a crash severity index (CSI) from the crash severity level, transmitting the crash severity index and the vehicle display instructions to the native crash severity computer application, receiving, by the native crash severity computer application, the crash severity index and the vehicle display instructions, and rendering the crash severity index for the location coordinates on a vehicle display.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
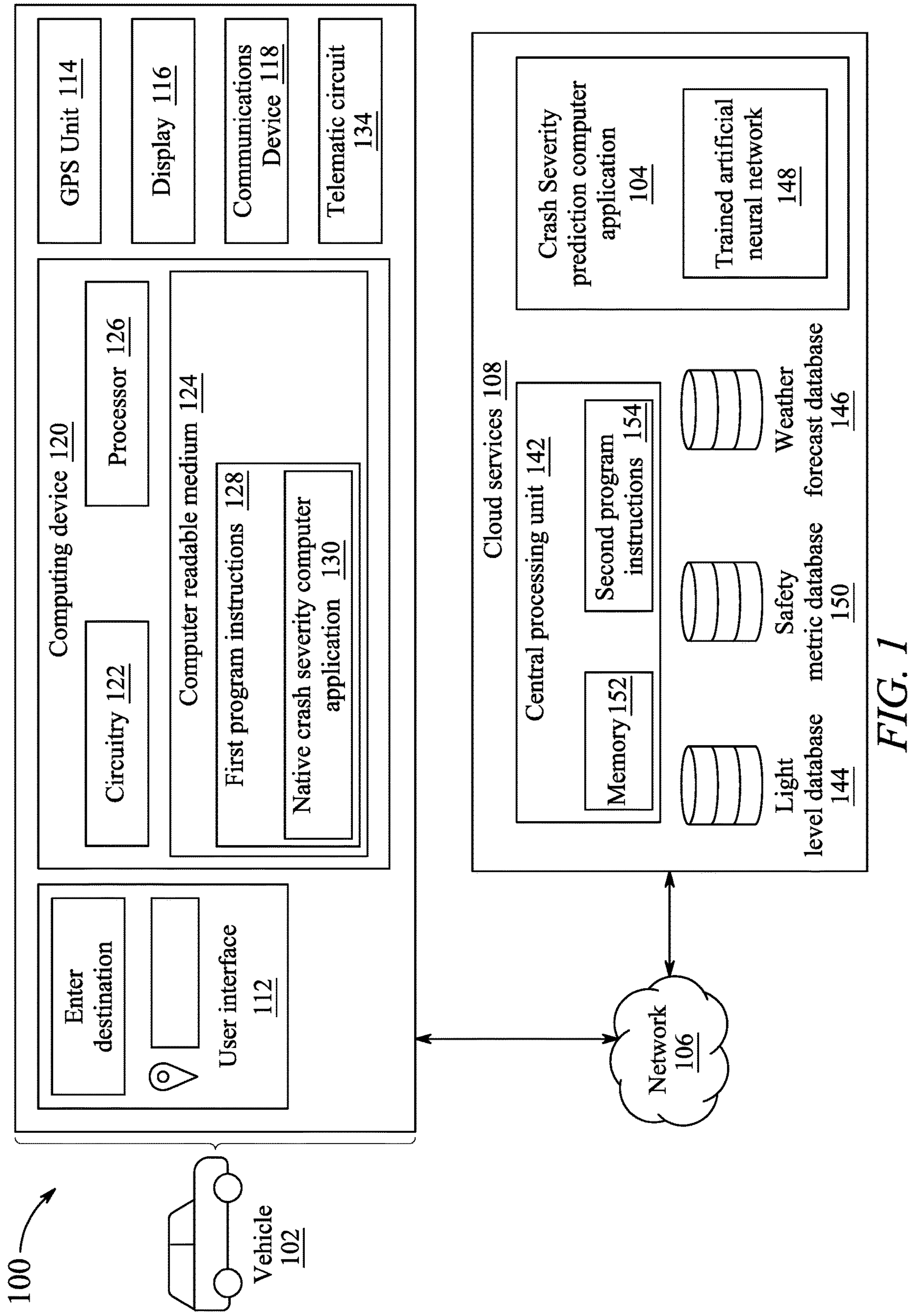
FIG. 1 illustrates a real time crash severity prediction system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for a real time crash severity prediction system. The system, device and method for a real time crash severity prediction system provide a real time traffic crash severity prediction tool. The real time traffic crash severity indication tool causes a crash severity warning to appear on a vehicle display (dashboard display, console display) when a probability of a crash increases. The real time traffic crash severity indication tool provides an early indication about the severity of a possible crash on a specific route that can be helpful for a driver to choose a different route, time and/or mode of travel.

Traffic crash data for a period of 6 years (2011-2016) for the Great Britain is used for analysis. The effect of four exogenous variables, namely road surface condition, weather condition, light condition, and day of the week, is analyzed. The real time traffic crash severity indication tool predicts the severity level of a possible crash based on the existing conditions of the four exogenous variables.

FIG. 1 illustrates a real time crash severity prediction system 100, according to some embodiments. The system includes a vehicle 102 and a crash severity prediction computer application 104 operatively connected to cloud services 108, coupled through a network 106. The vehicle 102 may be any automobile, including a private vehicle or a commercial vehicle. The vehicle may be a light motor vehicle or heavy motor vehicle, including tractor trailers, box trucks, semi-trailers, vans, sedans, coupes, suburban utility vehicles (SUVs), and the like.

The vehicle 102 includes a user interface 112, a global positioning system (GPS) unit 114, a display 116, a communication devices 118, and a computing device 120. The GPS unit 114, the display 116, the communications device 118, and the computing device 120 may be a part of a telematics circuit 134 or independent of the telematics circuit 134.

The user interface 112 is communicatively coupled to the GPS unit 114 and the computing device 120, and configured to receive a user destination. The user interface 112 is an interface between a user and the GPS unit 114 the computing device 120. In one example, the user interface 112 may be implemented using a touch-screen device for receiving user inputs and displaying outputs. In some examples, the user interface 112 may be implemented as a proprietary device that includes a display, a keyboard or input buttons and an audio receiver for receiving user input. In some examples, the user interface 112 may be implemented through a mobile device communicatively coupled to the vehicle 102. In some examples, the user interface 112 in conjunction with computing device 120 may perform activities, such as preparing a travel itinerary, considering travel preferences, obtaining a map related to a route, and obtaining directions to a destination. In some examples, the user interface 112 may present one or more questions with relevant options for answers using user-interface elements, such as drop down lists, check boxes, radio buttons, text input fields, and the like. The user interface 112 may be implemented using a variety of programming languages or programming methods, such as HTML, VBScript, JavaScript, XML, XSLT, AJAX, Java, and Swing.

The GPS unit 114 is configured to determine location coordinates of the vehicle 102 and, based on a user provided destination, generate a road map depicting one or more roadways between a user start location and the user destination. The GPS unit 114 generates one or more roadways between the user start location and the user destination location using available location information from a database (not shown). Such database may include data to calculate routes, provide directions, provide location information, and the like. For example, the database may include geographical or topological map data, road data, waterway data, railway data, lodging information (e.g., campgrounds, motor parks, or hotels), tourist destinations, retail store information (e.g., gas stations, grocery stores, laundromats, or shopping centers), and scenic destinations. In some examples, the GPS unit 114 may have a limited storage that stores the locations and the routes the user may have travelled frequently and/or occasionally. In some examples, the GPS unit 114 may use the stored map information to generate one or more routes between the source location and the destination location. The display 116 may be built-in to the vehicle 102 or an external display device, such as implemented using a mobile device by communicatively coupling with the vehicle 102 through standard interfaces such as universal serial bus (USB) and such interfaces. In some examples, the display 116 may include, but is not limited to a windshield projection display, a dashboard instrument panel, and a console display unit. In some examples, the user interface 112 may be implemented through the display 116, such as by using a touchscreen.

The communications device 118 may be configured to enable communication between the computing device 120 and external devices through the network 106. In some examples, the communications device 118 may be a local area network (LAN) interface, a wide area network (WAN) interface, a Bluetooth interface, and the like. According to various implementations, the communications device 118 is configured to communicate with the crash severity prediction computer application 104 via a network through one or more of the aforementioned interfaces.

The computing device 120 is operatively connected to the GPS unit 114, the display 116 and the communications device 118. The computing device 120 includes circuitry 122, a computer-readable medium 124, and a processor 126. The computer-readable medium 124 may be configured with first program instructions 128 including a native crash severity computer application 130 The processor 126 is configured to execute the first program instructions 128. The first program instructions 128 may include an operating system, application programs, and associated databases.

The native crash severity computer application 130 is a client application configured to obtain location coordinates, such current location and destination location (for example, from GPS unit 114) and the roadmap, and communicate the GPS coordinates to the crash severity prediction computer application 104. In an example, the native crash severity computer application 130 may be implemented by default into the computing device 120 of the vehicle. In another example, the computing device 120 may allow a user of the vehicle 102 to download and install the native crash severity computer application 130 from an application distribution platform. Examples of application distribution platforms include the App Store for iOS provided by Apple, Inc., Play Store for Android OS provided by Google Inc, and such application distribution platforms. In some examples, the native crash severity computer application 130 may be simply accessed through a browser provided by the computing device 120 through the display 116 or the user interface 112.

The vehicle 102 may include a vehicle-based telematics circuit 134 for sensing environmental parameters during the operation of the vehicle 102. The telematics circuit 134 may include exteroceptive sensors or measuring devices which may, for example, include at least one of a radar device for monitoring surrounding of the vehicle 102 and a LIDAR device for monitoring surrounding of the vehicle 102, the GPS unit 114 or vehicle tracking devices for measuring positioning parameters of the vehicle 102, one or more acoustic sensors to measure a noise level of the road surface, odometrical devices for complementing and improving positioning parameters measured by the GPS unit 114, vehicle tracking devices, computer vision devices, video cameras (such as, dashboard cameras, reverse parking camera) for monitoring the surrounding of the vehicle 102, and ultrasonic sensors for measuring the position of objects close to the vehicle 102. The telematics circuit 134 may also include proprioceptive sensors or measuring devices for sensing operating parameters of the vehicle 102, including motor speed and/or wheel load and/or heading and/or battery status of the vehicle 102, and the like. The exteroceptive sensors or proprioceptive sensors including the light meter may be implemented outside, inside and/or both using provisions provided thereof, or through additional structures such as on a retractable shield, positioned on the grill, etc.

The telematics circuit 134 may determine real-time road conditions, weather conditions, and light conditions, based on input from various sensors to predict the risk in real-time. In some examples, the telematics circuit 134 may communicate the determined real-time road conditions, weather conditions and vehicle conditions to the crash severity prediction computer application 104. In some example implementations, the computing device 120 may perform the functions of the telematics circuit 134.

The crash severity prediction computer application 104 is an application configured to obtain the location coordinates and the road map, from the native crash severity computer application 130 and calculate a crash severity index (CSI) from a predicted crash severity level. The crash severity prediction computer application 104 is communicably connected to the native crash severity computer application 130. The CSI may be a metric and defined as a change in a percentage of severe crashes for given conditions to a percentage of severe crashes for an average condition (benchmark). A given condition may be a condition that is known, such as a specific day of the week, sunny, twilight, darkness, roadway lighting levels, rain, snow, dry road surfaces, and the like. The crash severity level may refer to a highest severity level for a given crash situation. For a crash, there may be different types of injuries. Some example injuries are listed below:

K: (fatal) deaths that occur within twelve months of a crash;

A: (disabling) injuries serious enough to prevent normal activity for at least one day such as massive loss of blood, broken bones, etc.;

B: (evident) non-K or non-A injuries that are evident at the scene, such as bruises, swelling, limping, etc.;

C: (possible) no visible injury, but receiving complaints of pain or momentary unconsciousness from an accident victim;

0: (none) no injury; and

U: (unknown) unknown if any injury occurred.

In an example, if a crash involves two cars where a driver of car 1 was killed but everyone else from car 1 and car 2 sustained either a "B" or "C" level injury, the crash severity level for the crash is identified as "K", due to the casualty which is the highest severity level. The crash severity prediction computer application 104 may communicate the CSI and the vehicle display instructions to the native crash severity computer application 130.

The crash severity prediction computer application 104 is operatively connected to cloud services 108 that include a central processing unit 142, a street light database 144 storing street light settings for the planned route, a weather forecast database 146 and a trained artificial neural network (ANN) 148. Although FIG. 1 illustrates that the crash severity prediction computer application 104 is operatively connected to cloud services, in some examples, the crash severity prediction computer application 104 may be implemented in servers, such as standalone servers or distributed servers.

The central processing unit 142 includes a memory 152. The memory 152 is configured to store the location coordinates and the road map, a set of vehicle display instructions, severity factors, and second program instructions 154. The severity factors may include, but are not limited to, a number of vehicles involved in a crash, road material type, a road class, a speed limit at the location coordinates, an area types an intersection type, an intersection control, and a vehicle type. The road material type includes one or more of concrete, asphalt, gravel, earth, mixed rock fragments, and bitumen. The road class includes any of an expressway, an interstate highway, a six lane road, a four lane road, and a two lane road. In some countries, such as in United States of America, there are four road classes as given below:

Class I: high speed two-lane highway on which motorists expect to travel at relatively high speeds.

Class II: suburban two-lane highway on which motorists are not expected to travel at relatively high speeds.

Class III: intermediate: similar to Class II highway on which motorists are not expected to travel at relatively high speeds.

Class IV: urban roads on which heavy traffic is expected at low speeds.

The area type includes any of a rural area, a city area, and a suburban area. The intersection type includes one of a four way intersection, a three way intersection, a Y-intersection, a traffic circle, and a T-intersection. The intersection control includes one or more of a traffic signal, one or more stop signs, and an intersection with no traffic guidance. The vehicle type includes one of a sedan, a coupe, a sports car, a station wagon, a sports utility vehicle, a pick-up truck, a tractor-trailer, and a van. The second program instructions 154 may include an operating system, application programs, and associated databases.

The street light database 144 includes information associated with street light records for each of the roadways. The street light database 144 may obtain the information associated with street light records from public databases or proprietary databases. The weather forecast database 146 is configured with real time weather conditions, ambient light levels (daylight, twilight, darkness, and the like) and real time road surface conditions at the location coordinates. The road surface conditions may be one of dry, one of wet and damp, snow covered, one of frost and ice covered, and flooded more than three (3) centimeters deep. The weather conditions include no precipitation and wind speed less than or equal to 8 m/s, rain and wind speed less than 8 m/s, snow and wind speed less than 8 m/s, no precipitation and wind speed greater than 8 m/s, rain and wind speed greater than 8 m/s, snow and wind speed greater than 8 m/s, and one of foggy and misty. The weather forecast database 146 may obtain the information associated with weather conditions, ambient light levels and real time road surface conditions from public databases or proprietary databases.

The safety metric database 150 may include safety metrics or other safety data related to a transportation structure. According to the disclosure, a transportation structure may include structures such as roads, bridges, tunnels, overpasses, mountain passes, and the like. Safety metrics or other safety data may include inspection ratings, user feedback ratings, accident metrics, traffic congestion, weather hazards (e.g., risk of mudslides, rock falls, or wash outs), or condition of a transportation structure obtained directly, from public databases or private databases. The street light database 144, the weather forecast database 146, the safety metric database 150 and other databases described herein may be implemented as a relational database, a centralized database, a distributed database, an object oriented database, or a flat database in various implementations. In one or more implementations, street light database 144, the weather forecast database 146, the safety metric database 150 and other databases may be periodically or regularly updated, mirrored, synchronized, replicated, or otherwise provided by external data source (e.g., map generation service). The street light database 144 holds records indicating the location of street lights on each roadways, and the times at which the street lights are lit or unlit.

The central processing unit 142 is configured to calculate a light condition at the location coordinates based on the street light records and the ambient light levels, i.e., daylight or night time darkness. The light condition is one of daylight, night time and street lights lit, night time and street lights unlit, and night time and street lights absent.

The ANN 148 may be initially trained on a random sample of datapoints from a crash dataset. This sample consists of a variety of conditions for each variable. The variable conditions associated with this random sample are referred to as the base conditions. Thus, the predictions based on these base conditions are referred as the severity predictions for the base conditions.

The trained ANN 148 is configured to predict a crash severity level based on the real time weather conditions, the light condition, the road surface conditions, a day of the week, and the severity factors. In an example, the trained ANN 148 is generated by training an ANN on a dataset of historical crash statistics for the roadways (provided as an example in the data description section below). The ANN is a distributed information processing system designed based on the nature of human brains, are capable of approximating any finite nonlinear models to determine a relation between dependent and independent variables. The ANN may include three or more layers having neural cells or neurons. Each neural cell (neuron) in any layer is related to the entire next layer neurons through connections weighted with coefficients called "weight coefficients". Any change in weight coefficients may alter the function of the network. One of the goals of the network training is to determine best weight coefficients to obtain the desired output. The change in weight coefficients may result from learning patterns. In training a multilayer perceptron (MLP), the inputs of the first layer multiplied by weight coefficients that are a randomly selected number are then entered into the neurons in second layer. There may be multiple layers that are referred to as hyperparameters, also called as hidden layers. In machine learning, a hyperparameter is a parameter whose value is used to control a learning process. In contrast, the values of other parameters (typically node weights) are derived via training. Hyperparameters can be classified as model hyperparameters, that cannot be inferred while fitting the machine to the training set because they refer to a model selection task, or algorithm hyperparameters, that in principle have no influence on the performance of the model but affect the speed and quality of the learning process. An example of a model hyperparameter is the topology and size of a neural network. Examples of algorithm hyperparameters are learning rate and mini-batch size. Hyperparameters and the number of neurons for the ANN model are selected using an exhaustive searching process. Any neuron functions in two ways: one is to calculate the sum of the inputs, defined as neti, another is to insert the sum in a function called "activation function". The trained ANN is configured to generate clusters of the severity levels of the crashes.

Using the crash severity level, the central processing unit 142 is configured to calculate the CSI, and transmit the CSI and the vehicle display instructions to the native crash severity computer application 130. Based on the vehicle display instructions, the native crash severity computer application 130 is configured to render the crash severity index on the display 116 that may include a CSI for each roadway on the road map and/or a CSI related to the location coordinates on the display 116. An example, CSI calculation based on a crash dataset of six years is provided below.

Example Data Description

For training the ANN, input variables used, which were related to routes selected, vehicle data, and environmental data, are shown in Table 1.

TABLE 1

| Input Variables | | |
|---|---|---|
| Input Variable | Type | No of Categories |
| Number of vehicles involved | Continuous | As indicated |
| Day of the week | Categorical | 7 |
| Road surface condition | Categorical | 5 |
| Road Type | Categorical | 5 |
| 1st Road Class | Categorical | 6 |
| Speed Limit | Continuous | As indicated |
| Light Condition | Categorical | 4 |
| Weather Condition | Categorical | 7 |
| Area Type | Categorical | 2 |
| Intersection Type | Categorical | 5 |
| Intersection Control | Categorical | 4 |
| Vehicle Type | Continuous | As indicated |

The four exogenous variables which were selected for training the ANN are shown in Table 2 along with their categories.

TABLE 2

| Exogenous Variables | |
|---|---|
| **Exogenous Variables** | **Description** |
| Day of the week | Sunday = 1, Monday = 2, Tuesday = 3, Wednesday = 4, Thursday = 5, Friday = 6, Saturday = 7 |
| Road surface condition | Dry = 1, Wet or damp = 2, Snow = 3, Frost or ice = 4, Flood over 3 cm. deep = 5 |
| Light Condition | Daylight = 1, Night time and street lights lit = 2, Night time and street lights unlit = 3, Night time and street lights absent = 4 |
| Weather Condition | Fine and no high winds = 1, Raining no high winds = 2, Snow and no high winds = 3, Fine with high winds = 4, Raining with high winds = 5, Snow with high winds = 6, For or Mist = 7 |

In Table 2, for the light condition, condition 3 means that the road has streetlights, but the streetlights are unlit. Some regions may use only part-night street lighting. Part-night streetlighting is a concept in which streetlights are unlit during a certain time period (i.e., after midnight) when they are not needed on less busy roads. For example, streetlights may be turned off between lam and 5 am, Tuesday to Sunday until 5 am on Monday mornings. Part-night street lighting is cost effective and environmentally friendly. However, condition 4 means that streetlights are not installed on that specific roadway, such as for a rural road, private road, or driveway.

The output of the trained ANN is the crash severity level, which consists of three levels (fatal, serious and slight). Due to a low number of fatal crashes in the dataset, fatal and serious crashes were merged into one category as "severe crash", while "slight" is considered as a non-severe crash. The dataset was cleaned and filtered by deleting all duplicate and empty cells.

Figure 2:
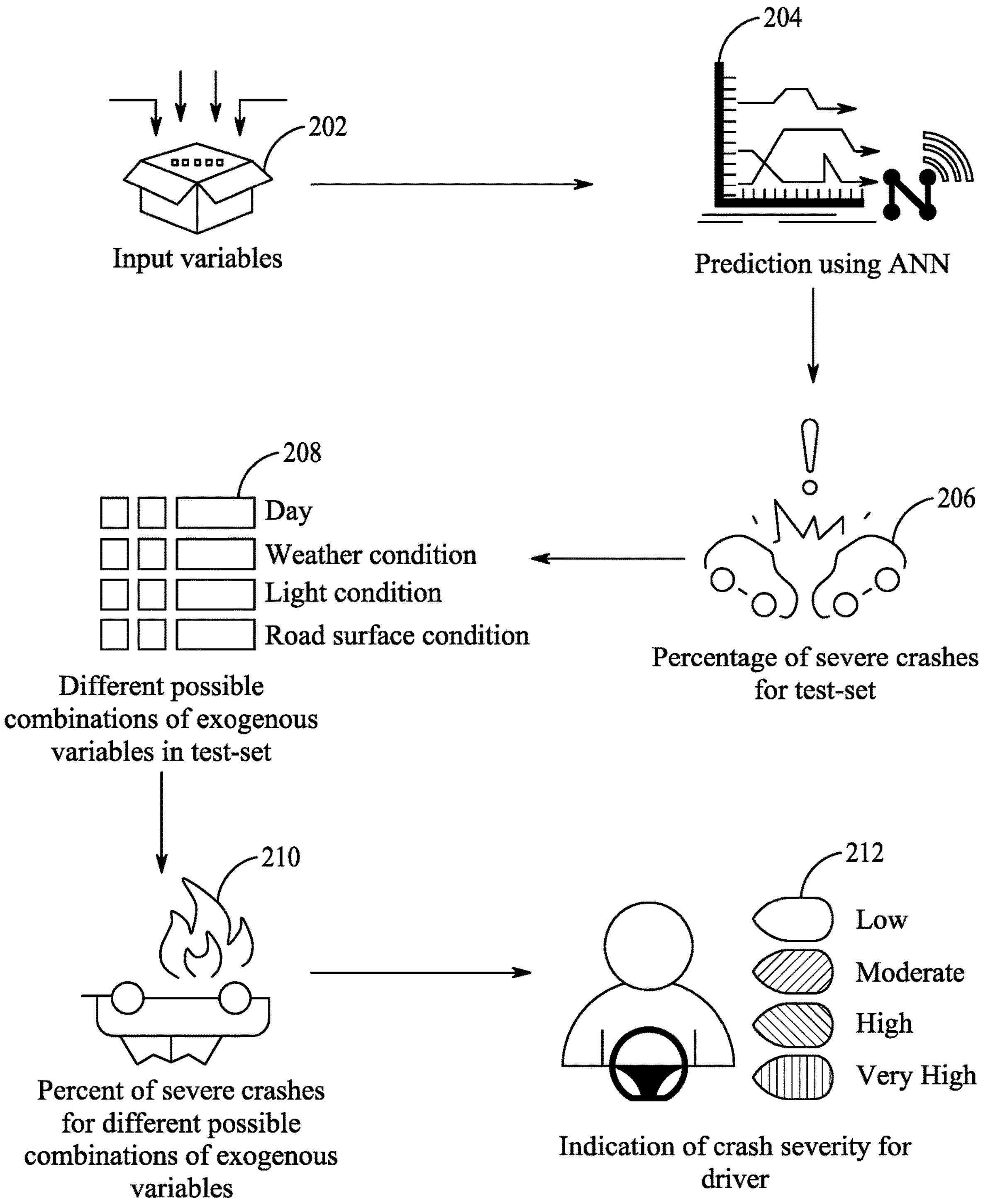
FIG. 2 illustrates an exemplary methodology for predicting real time crash severity, according to certain embodiments.

FIG. 2 illustrates a methodology for predicting real time crash severity. Input variables are provided as input for ANN (shown in Table 1). The ANN includes basic units, referred to as neurons. The neurons are configured to mimic the function of a human brain. For developing the ANN, in step 202, a random sample of 10,000 crash points (also referred to as input data) having an equal percentage of each severity class was used as input for the model along with the input variables. An equal percentage of crashes was selected in order to avoid biasing the model towards one specific class. The input data was distributed into groups of 70% and 30% for training and validating the model, respectively. Hyper-parameters such as the number of hidden layers and the number of neurons for the ANN model were selected using an exhaustive searching process. The hyperparameters which gave the highest accuracy without overfitting were selected for the model. The model was selected based on the highest accuracy and an F1 score which are well known metrics for ANN models. The F1 score is a measure of a model's accuracy on a dataset.

A random sample of 5000 crash points was selected from the aforementioned 6-year crash dataset. Since crashes are random events, crash points of at least three (3) years may be required for accurate modeling. In step 204, new predictions for a random sample set of 5000 crash points were performed using the trained ANN model. Although data associated with severity of each piece of data of the total input data was known, new predictions were made in order to be consistent. The sample set included a variety of conditions for each variable. In step 206, a percentage of severe crashes to all the crashes in the sample set (also referred to as test-set) was calculated. The calculated percentage was referred to as a benchmark percentage for base conditions. Given that the 5000 pieces of input data covered a wide range of human, vehicle, environment, and exogenous variables (that include day, weather condition, light condition and road surface condition) over six years, in step 208, an average severity of the sample set was represented as a good reference benchmark. In step 210, to investigate the effect of four exogenous variables (as shown in Table 2) on the traffic crash severity, a process for calculating a percentage of severe crashes for each combination of these variables was determined. A total number of combinations for the exogenous variables are shown in Table 3.

TABLE 3

| Possible Combinations | | |
|---|---|---|
| **Exogenous Variables** | **No of Categories** | **Total Possible Combinations** |
| Day of the week | 7 | 7 × 5 × 4 × 7 = 980 |
| Road surface condition | 5 | |
| Light Condition | 4 | |
| Weather Condition | 7 | |

A dataset for each combination was prepared by replacing each category for these exogenous variables with only one category for each respective exogenous variable in the same sample set, while the values for the other eight variables were unchanged. Subsequently, one sample dataset was determined for each combination consisting of 5000 crashes. Predictions using the trained ANN were generated and a percentage of severe crashes to all the crashes was calculated for each dataset. A metric referred to as the CSI was calculated using the below, which is given by:

$$CSI = \frac{PSCAC - PSCGC}{PSCAC}, \quad (1)$$

where PSCAC is a percentage of severe crashes for base conditions, and PSCGC is a percentage of severe crashes for the real time weather condition, the light condition, and the road surface condition at the location coordinates. With the predicted percent severe crashes for base conditions compared with the predicted percent severe crashes for given conditions, the process was fair and consistent as discussed above. The value of the CSI provided the average effect of changing one or more of the four exogenous factors on the prediction of the severity of each of the 5000 crashes for the given input factors (provided in Table 1). In step 212, after calculating the CSI, each possible combination was assigned a relative severity level ranging from low to very high. The criteria for the relative severity level is shown in Table 4.

TABLE 4

| Relative Severity Level | | |
|---|---|---|
| **Relative severity level** | **Criteria (Percent severe Crashes)** | **Criteria (CSI)** |
| Very low | <=30% | <−0.375 |
| Low | 30% to 40% | between −0.375 & −0.167 |

TABLE 4-continued

| Relative Severity Level | | |
|---|---|---|
| Relative severity level | Criteria (Percent severe Crashes) | Criteria (CSI) |
| Moderate | 40% to 60% | between −0.167 & 0.250 |
| High | 60% to 70% | between 0.250 & 0.458 |
| Very High | >70% | >0.458 |

As described, CSI is a crash severity indicator, which indicates the expected severity of a possible crash.

As described, the ANN model was trained and tested using the input data. The accuracy and F1 score of the ANN model were calculated. The ANN model demonstrated a reasonable performance with a training and testing accuracy of 74.3% and 72.2%, respectively. The F1 score for severe and non-severe crashes was found to be 0.73 and 0.72, respectively. From the F1 score, it was evident that the ANN model performed equally well for each severity class. After developing and testing the ANN model, the predictions for the crash severity levels were made for a new sample of 5000 crash points. Initially, the percentage of severe crashes for the benchmark conditions was calculated, and the percent of severe crashes was found to be 48%. Using this percentage, the CSI index was calculated for 205 cases of the possible combinations shown in Table 5. Since the possible combinations are large, 200 cases are provided as an example for the sake of brevity. These results can be extended to all the possible combinations. Based on the CSI index a relative severity level was assigned for each case shown in Table 5, Table 6 and Table 7. The relative severity level ranging from very low to very high was assigned based on the relationship shown in Table 4 and FIG. 3.

Figure 3:
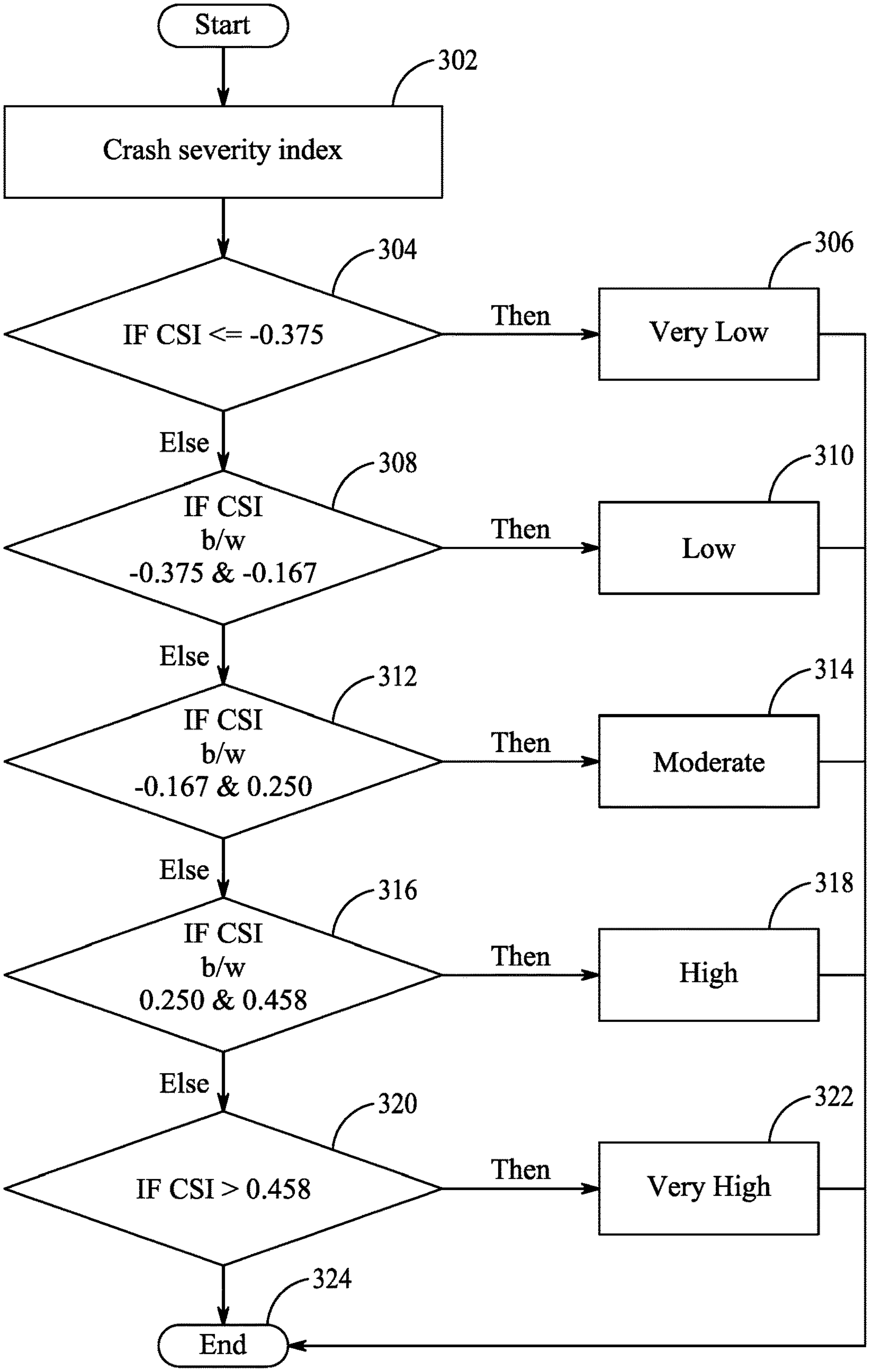
FIG. 3 illustrates a flow chart depicting a relative severity level ranging based on the CSI, according to certain embodiments.

FIG. 3 illustrates a flow chart of the relative severity level ranging based on the CSI values. In step 302, the crash severity prediction computer application 104 determines a CSI. In step 304, the crash severity prediction computer application 104 determines whether the CSI is less than or equal to −0.375. If the CSI is less than or equal to −0.375, then in step 306, the crash severity prediction computer application 104 determines that the severity is very low. In step 308, the crash severity prediction computer application 104 determines if the CSI values are between −0.375 and −0.167. If the CSI is between the values −0.375 and −0.167, then in step 310, the crash severity prediction computer application 104 determines that the severity is low. In step 312, the crash severity prediction computer application 104 determines if the CSI values are between values −0.167 and 0.250. If the CSI is between the CSI values −0.167 and 0.250, then in step 314, the crash severity prediction computer application 104 determines that the severity is moderate. In step 316, the crash severity prediction computer application 104 determines if the CSI values are between 0.250 and 0.458. If the CSI values are between 0.250 and 0.458, then in step 318, the crash severity prediction computer application 104 determines that the severity is high. In step 320, the crash severity prediction computer application 104 determines if the CSI value is greater than 0.458. If the CSI value is greater than 0.458, then in step 322, the crash severity prediction computer application 104 determines that the severity is very high.

Figure 4:
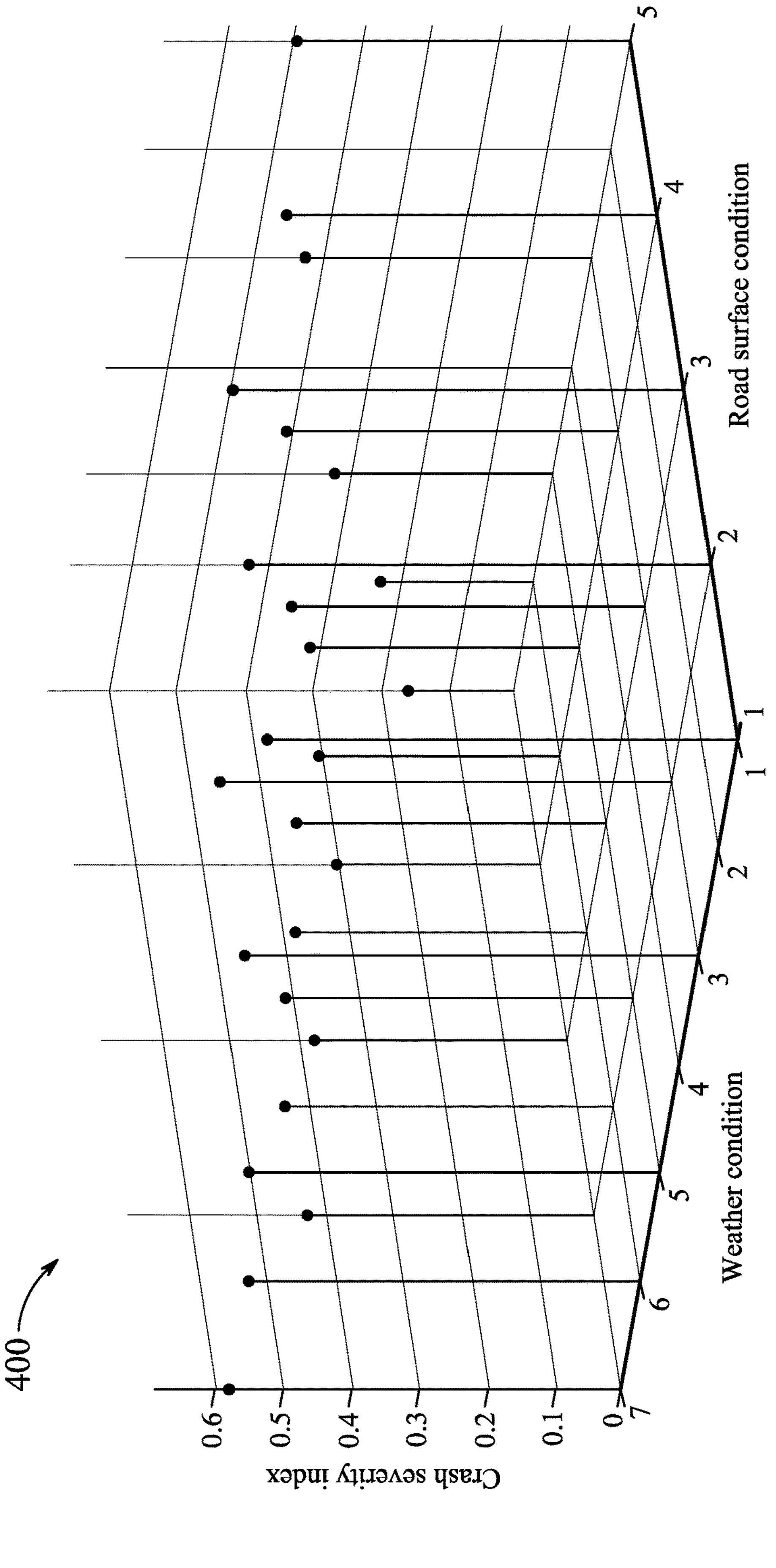
FIG. 4 is a 3-dimensional graph of CSI versus weather condition and road surface condition, for a Sunday, with darkness and no street lighting according to certain embodiments.
Figure 5:
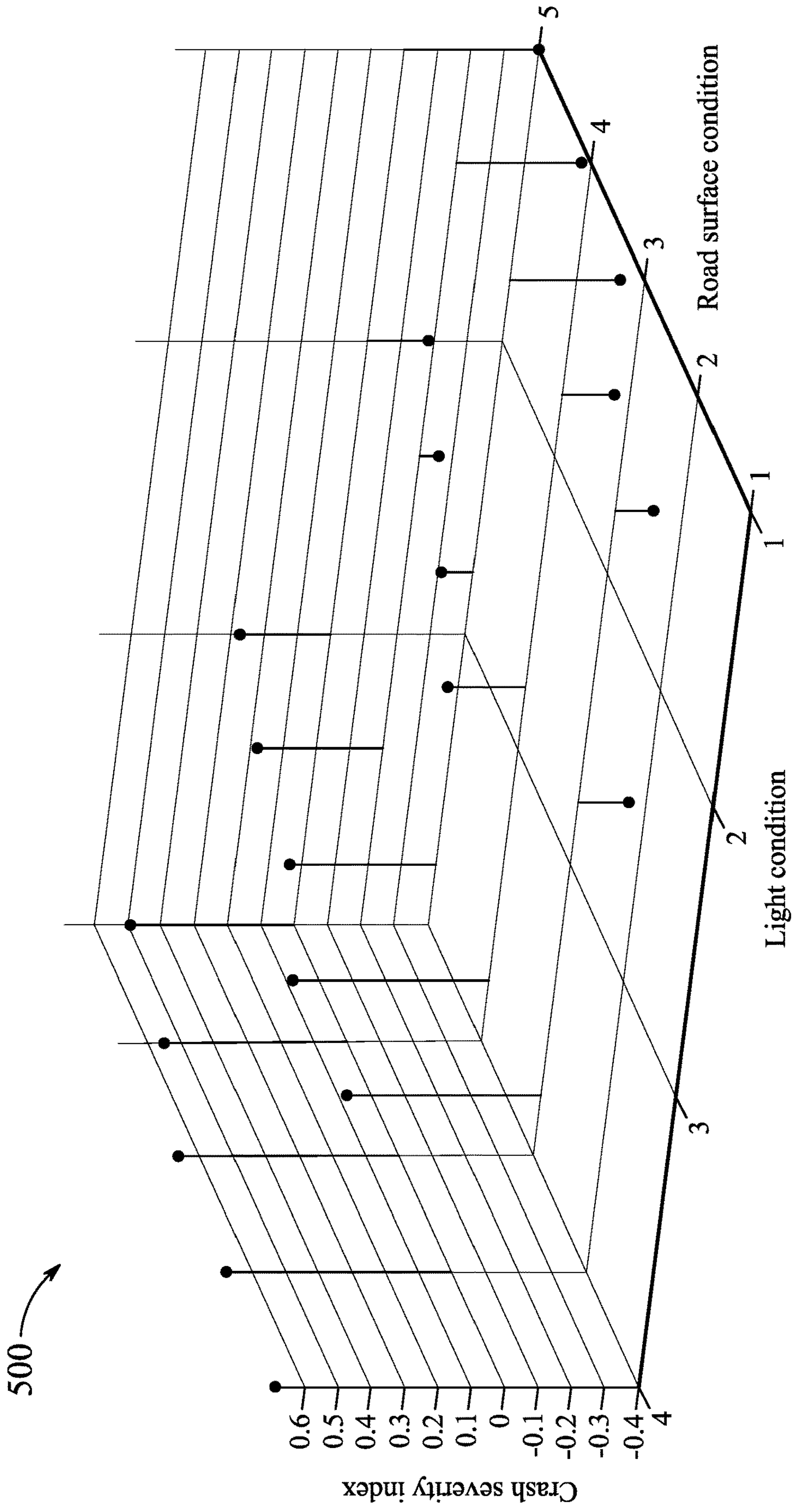
FIG. 5 is a 3-dimensional graph of CSI versus lighting conditions and road surface condition, for a Sunday with darkness, good weather, and wind less than eight meters per second, according to certain embodiments.

The results of a few possible combinations are provided in the Table 5, Table 6 and Table 7 for days of the week including Sunday, Friday and Monday, respectively. The results are presented in the form of 3D graphs as shown in FIG. 4 and FIG. 5. FIG. 4 shows a crash severity index plot based on weather conditions and road surface conditions. FIG. 5 shows a crash severity index plot based on light conditions and road surface conditions. In the tables, "fine" is defined as weather conditions in which there is clear visibility, daytime sunlight or nighttime roadway lighting with clear visibility, with an atmospheric condition having minimal moisture or no precipitation. The term "no high winds" is defines as wind speeds less than or equal to 8 m/s.

TABLE 5

| Lookup table for Severity Level (Sunday) | | | | | |
|---|---|---|---|---|---|
| Day | Road surface condition | Light condition | Weather condition | Severity Index | Severity level of a possible crash |
| Sunday | Dry | Daylight | Fine and no high winds | −0.116 | moderate |
| Sunday | Wet or Damp | Daylight | Fine and no high winds | −0.156 | moderate |
| Sunday | Snow | Daylight | Fine and no high winds | −0.333 | low |
| Sunday | Frost or Ice | Daylight | Fine and no high winds | −0.376 | very low |
| Sunday | Flood over 3 cm | Daylight | Fine and no high winds | −0.408 | very low |
| Sunday | Dry | Night time and street lights lit | Fine and no high winds | −0.151 | moderate |
| Sunday | Wet or Damp | Night time and street lights lit | Fine and no high winds | 0.235 | moderate |
| Sunday | Snow winds | Night time and street lights lit | Fine and no high | 0.094 | moderate |
| Sunday | Frost or Ice | Night time and street lights lit | Fine and no high winds | −0.055 | moderate |
| Sunday | Flood over 3 cm | Night time and street lights lit | Fine and no high winds | −0.186 | low |
| Sunday | Dry | Night time and street lights unlit | Fine and no high winds | 0.587 | very high |
| Sunday | Wet or Damp | Night time and street lights unlit | Fine and no high winds | 0.591 | very high |

TABLE 5-continued

| Lookup table for Severity Level (Sunday) | | | | | |
|---|---|---|---|---|---|
| Day | Road surface condition | Light condition | Weather condition | Severity Index | Severity level of a possible crash |
| Sunday | Snow | Night time and street lights unlit | Fine and no high winds | 0.442 | high |
| Sunday | Frost or Ice | Night time and street lights unlit | Fine and no high winds | 0.379 | high |
| Sunday | Flood over 3 cm | Night time and street lights unlit | Fine and no high winds | 0.269 | high |
| Sunday | Dry | Night time and street lights absent | Fine and no high winds | 0.691 | very high |
| Sunday | Wet or Damp | Night time and street lights absent | Fine and no high winds | 0.679 | very high |
| Sunday | Snow | Night time and street lights absent | Fine and no high winds | 0.664 | very high |
| Sunday | Frost or Ice | Night time and street lights absent | Fine and no high winds | 0.547 | very high |
| Sunday | Flood over 3 cm | Night time and street lights absent | Fine and no high winds | 0.491 | very high |
| Sunday | Dry | Daylight | Raining no high winds | −0.151 | moderate |
| Sunday | Wet or Damp | Daylight | Raining no high winds | −0.364 | low |
| Sunday | Snow | Daylight | Raining no high winds | −0.364 | low |
| Sunday | Frost or Ice | Daylight | Raining no high winds | −0.397 | very low |
| Sunday | Flood over 3 cm | Daylight | Raining no high winds | −0.426 | very low |
| Sunday | Dry | Night time and street lights lit | Raining no high winds | 0.217 | moderate |
| Sunday | Wet or Damp | Night time and street lights lit | Raining no high winds | 0.195 | moderate |
| Sunday | Snow | Night time and street lights lit | Raining no high winds | 0.035 | moderate |
| Sunday | Frost or Ice | Night time and street lights lit | Raining no high winds | −0.107 | moderate |
| Sunday | Flood over 3 cm | Night time and street lights lit | Raining no high winds | −0.202 | low |
| Sunday | Dry | Night time and street lights unlit | Raining no high winds | 0.567 | very high |
| Sunday | Wet or Damp | Night time and street lights unlit | Raining no high winds | 0.568 | very high |
| Sunday | Snow | Night time and street lights unlit | Raining no high winds | 0.418 | high |
| Sunday | Frost or Ice | Night time and street lights unlit | Raining no high winds | 0.418 | high |
| Sunday | Flood over 3 cm | Night time and street lights unlit | Raining no high winds | 0.128 | moderate |
| Sunday | Dry | Daylight | Snow and no high winds | −0.176 | low |
| Sunday | Wet or Damp | Daylight | Snow and no high winds | −0.347 | low |
| Sunday | Snow | Daylight | Snow and no high winds | −0.380 | very low |
| Sunday | Frost or Ice | Daylight | Snow and no high winds | −0.420 | very low |
| Sunday | Flood over 3 cm | Daylight | Snow and no high winds | −0.450 | very low |
| Sunday | Dry | Night time and street lights lit | Snow and no high winds | 0.547 | very high |
| Sunday | Wet or Damp | Night time and street lights lit | Snow and no high winds | 0.518 | very high |
| Sunday | Snow | Night time and street lights lit | Snow and no high winds | 0.372 | high |
| Sunday | Frost or Ice | Night time and street lights lit | Snow and no high winds | 0.292 | high |
| Sunday | Flood over 3 cm | Night time and street lights lit | Snow and no high winds | 0.107 | moderate |
| Sunday | Dry | Night time and street lights absent | Snow and no high winds | 0.667 | very high |
| Sunday | Wet or Damp | Night time and street lights absent | Snow and no high winds | 0.665 | very high |
| Sunday | Snow | Night time and street lights absent | Snow and no high winds | 0.521 | very high |

TABLE 5-continued

Lookup table for Severity Level (Sunday)

| Day | Road surface condition | Light condition | Weather condition | Severity Index | Severity level of a possible crash |
|---|---|---|---|---|---|
| Sunday | Frost or Ice | Night time and street lights absent | Snow and no high winds | 0.490 | very high |
| Sunday | Flood over 3 cm | Night time and street lights absent | Snow and no high winds | 0.423 | high |
| Sunday | Dry | Night time and street lights lit | Fine with high winds | 0.120 | moderate |
| Sunday | Wet or Damp | Night time and street lights lit | Fine with high winds | 0.000 | moderate |
| Sunday | Snow | Night time and street lights lit | Fine with high winds | −0.100 | moderate |
| Sunday | Frost or Ice | Night time and street lights lit | Fine with high winds | −0.220 | low |
| Sunday | Flood over 3 cm | Night time and street lights lit | Fine with high winds | −0.265 | low |
| Sunday | Dry | Night time and street lights lit | Raining with high winds | 0.086 | moderate |
| Sunday | Wet or Damp | Night time and street lights lit | Raining with high winds | −0.062 | moderate |
| Sunday | Snow | Night time and street lights lit | Raining with high winds | −0.158 | moderate |
| Sunday | Frost or Ice | Night time and street lights lit | Raining with high winds | −0.241 | low |
| Sunday | Flood over 3 cm | Night time and street lights lit | Raining with high winds | −0.279 | low |
| Sunday | Dry | Night time and street lights unlit | Raining with high winds | 0.469 | very high |
| Sunday | Wet or Damp | Night time and street lights unlit | Raining with high winds | 0.361 | high |
| Sunday | Snow | Night time and street lights unlit | Raining with high winds | 0.293 | high |
| Sunday | Frost or Ice | Night time and street lights unlit | Raining with high winds | 0.136 | moderate |
| Sunday | Flood over 3 cm | Night time and street lights unlit | Raining with high winds | 0.037 | moderate |
| Sunday | Dry | Night time and street lights absent | Raining with high winds | 0.607 | very high |
| Sunday | Wet or Damp | Night time and street lights absent | Raining with high winds | 0.514 | very high |
| Sunday | Snow | Night time and street lights absent | Raining with high winds | 0.458 | very high |
| Sunday | Frost or Ice | Night time and street lights absent | Raining with high winds | 0.398 | high |
| Sunday | Flood over 3 cm | Night time and street lights absent | Raining with high winds | 0.325 | high |
| Sunday | Dry | Daylight | Snow with high winds | −0.259 | low |
| Sunday | Wet or Damp | Daylight | Snow with high winds | −0.418 | very low |
| Sunday | Snow | Daylight | Snow with high winds | −0.455 | very low |
| Sunday | Frost or Ice | Daylight | Snow with high winds | −0.486 | very low |
| Sunday | Flood over 3 cm | Daylight | Snow with high winds | −0.501 | very low |
| Sunday | Dry | Night time and street lights lit | Snow with high winds | 0.005 | moderate |
| Sunday | Wet or Damp | Night time and street lights lit | Snow with high winds | −0.145 | moderate |
| Sunday | Snow | Night time and street lights lit | Snow with high winds | −0.240 | low |
| Sunday | Frost or Ice | Night time and street lights lit | Snow with high winds | −0.281 | low |
| Sunday | Flood over 3 cm | Night time and street lights lit | Snow with high winds | −0.299 | low |
| Sunday | Dry | Night time and street lights unlit | Snow with high winds | 0.445 | high |
| Sunday | Wet or Damp | Night time and street lights unlit | Snow with high winds | 0.307 | high |
| Sunday | Snow | Night time and street lights unlit | Snow with high winds | 0.235 | moderate |
| Sunday | Frost or Ice | Night time and street lights unlit | Snow with high winds | 0.072 | moderate |

TABLE 5-continued

| Lookup table for Severity Level (Sunday) | | | | | |
|---|---|---|---|---|---|
| Day | Road surface condition | Light condition | Weather condition | Severity Index | Severity level of a possible crash |
| Sunday | Flood over 3 cm | Night time and street lights unlit | Snow with high winds | 0.001 | moderate |
| Sunday | Dry | Night time and street lights absent | Snow with high winds | 0.579 | very high |
| Sunday | Wet or Damp | Night time and street lights absent | Snow with high winds | 0.482 | very high |
| Sunday | Snow | Night time and street lights absent | Snow with high winds | 0.431 | high |
| Sunday | Frost or Ice | Night time and street lights absent | Snow with high winds | 0.356 | high |
| Sunday | Flood over 3 cm | Night time and street lights absent | Snow with high winds | 0.227 | moderate |
| Sunday | Dry | Night time and street lights absent | Fog or Mist | 0.558 | very high |
| Sunday | Wet or Damp | Night time and street lights absent | Fog or Mist | 0.426 | high |
| Sunday | Snow | Night time and street lights absent | Fog or Mist | 0.377 | high |
| Sunday | Frost or Ice | Night time and street lights absent | Fog or Mist | 0.302 | high |
| Sunday | Flood over 3 cm | Night time and street lights absent | Fog or Mist | 0.159 | moderate |

TABLE 6

| Lookup table for Severity Level (Friday) | | | | | |
|---|---|---|---|---|---|
| Day | Road surface condition | Light condition | Weather condition | Severity Index | Severity level of possible crash |
| Friday | Dry | Daylight | Fine and no high winds | −0.096 | moderate |
| Friday | Wet or Damp | Daylight | Fine and no high winds | −0.139 | moderate |
| Friday | Snow | Daylight | Fine and no high winds | −0.304 | low |
| Friday | Frost or Ice | Daylight | Fine and no high winds | −0.371 | low |
| Friday | Flood over 3 cm | Daylight | Fine and no high winds | −0.415 | very low |
| Friday | Dry | Night time and street lights lit | Fine and no high winds | 0.277 | high |
| Friday | Wet or Damp | Night time and street lights lit | Fine and no high winds | 0.279 | high |
| Friday | Snow | Night time and street lights lit | Fine and no high winds | 0.190 | moderate |
| Friday | Frost or Ice | Night time and street lights lit | Fine and no high winds | 0.103 | moderate |
| Friday | Flood over 3 cm | Night time and street lights lit | Fine and no high winds | −0.149 | moderate |
| Friday | Dry | Night time and street lights unlit | Fine and no high winds | 0.586 | very high |
| Friday | Wet or Damp | Night time and street lights unlit | Fine and no high winds | 0.591 | very high |
| Friday | Snow | Night time and street lights unlit | Fine and no high winds | 0.549 | very high |
| Friday | Frost or Ice | Night time and street lights unlit | Fine and no high winds | 0.400 | high |
| Friday | Flood over 3 cm | Night time and street lights unlit | Fine and no high winds | 0.323 | high |
| Friday | Dry | Night time and street lights absent | Fine and no high winds | 0.704 | very high |
| Friday | Wet or Damp | Night time and street lights absent | Fine and no high winds | 0.701 | very high |

TABLE 6-continued

| Lookup table for Severity Level (Friday) | | | | | |
|---|---|---|---|---|---|
| Day | Road surface condition | Light condition | Weather condition | Severity Index | Severity level of possible crash |
| Friday | Snow | Night time and street lights absent | Fine and no high winds | 0.686 | very high |
| Friday | Frost or Ice | Night time and street lights absent | Fine and no high winds | 0.601 | very high |
| Friday | Flood over 3 cm | Night time and street lights absent | Fine and no high winds | 0.517 | very high |
| Friday | Dry | Night time and street lights lit | Raining no high winds | 0.251 | high |
| Friday | Wet or Damp | Night time and street lights lit | Raining no high winds | 0.244 | moderate |
| Friday | Snow | Night time and street lights lit | Raining no high winds | 0.097 | moderate |
| Friday | Frost or Ice | Night time and street lights lit | Raining no high winds | −0.018 | moderate |
| Friday | Flood over 3 cm | Night time and street lights lit | Raining no high winds | −0.172 | low |
| Friday | Dry | Night time and street lights absent | Snow and no high winds | 0.660 | very high |
| Friday | Wet or Damp | Night time and street lights absent | Snow and no high winds | 0.664 | very high |
| Friday | Snow | Night time and street lights absent | Snow and no high winds | 0.601 | very high |
| Friday | Frost or Ice | Night time and street lights absent | Snow and no high winds | 0.532 | very high |
| Friday | Flood over 3 cm | Night time and street lights absent | Snow and no high winds | 0.468 | very high |
| Friday | Dry | Daylight | Fine with high winds | −0.173 | low |
| Friday | Wet or Damp | Daylight | Fine with high winds | −0.348 | low |
| Friday | Snow | Daylight | Fine with high winds | −0.386 | very low |
| Friday | Frost or Ice | Daylight | Fine with high winds | −0.431 | very low |
| Friday | Flood over 3 cm | Daylight | Fine with high winds | −0.456 | very low |
| Friday | Dry | Night time and street lights unlit | Fine with high winds | 0.545 | very high |
| Friday | Wet or Damp | Night time and street lights unlit | Fine with high winds | 0.415 | high |
| Friday | Snow | Night time and street lights unlit | Fine with high winds | 0.381 | high |
| Friday | Frost or Ice | Night time and street lights unlit | Fine with high winds | 0.315 | high |
| Friday | Flood over 3 cm | Night time and street lights unlit | Fine with high winds | 0.103 | moderate |
| Friday | Dry | Night time and street lights absent | Snow with high winds | 0.634 | very high |
| Friday | Wet or Damp | Night time and street lights absent | Snow with high winds | 0.585 | very high |
| Friday | Snow | Night time and street lights absent | Snow with high winds | 0.473 | very high |
| Friday | Frost or Ice | Night time and street lights absent | Snow with high winds | 0.423 | high |
| Friday | Flood over 3 cm | Night time and street lights absent | Snow with high winds | 0.348 | high |
| Friday | Dry | Daylight | Fog or Mist | −0.341 | low |
| Friday | Wet or Damp | Daylight | Fog or Mist | −0.416 | very low |

TABLE 6-continued

| Lookup table for Severity Level (Friday) | | | | | |
|---|---|---|---|---|---|
| Day | Road surface condition | Light condition | Weather condition | Severity Index | Severity level of possible crash |
| Friday | Snow | Daylight | Fog or Mist | −0.452 | very low |
| Friday | Frost or Ice | Daylight | Fog or Mist | −0.483 | very low |
| Friday | Flood over 3 cm | Daylight | Fog or Mist | −0.508 | very low |
| Friday | Dry | Night time and street lights lit | Fog or Mist | 0.050 | moderate |
| Friday | Wet or Damp | Night time and street lights lit | Fog or Mist | −0.100 | moderate |
| Friday | Snow | Night time and street lights lit | Fog or Mist | −0.202 | low |
| Friday | Frost or Ice | Night time and street lights lit | Fog or Mist | −0.284 | low |
| Friday | Flood over 3 cm | Night time and street lights lit | Fog or Mist | −0.311 | low |
| Friday | Dry | Night time and street lights unlit | Fog or Mist | 0.457 | high |
| Friday | Wet or Damp | Night time and street lights unlit | Fog or Mist | 0.327 | high |
| Friday | Snow | Night time and street lights unlit | Fog or Mist | 0.266 | high |
| Friday | Frost or Ice | Night time and street lights unlit | Fog or Mist | 0.109 | moderate |
| Friday | Flood over 3 cm | Night time and street lights unlit | Fog or Mist | 0.019 | moderate |
| Friday | Dry | Night time and street lights absent | Fog or Mist | 0.591 | very high |
| Friday | Wet or Damp | Night time and street lights absent | Fog or Mist | 0.480 | very high |
| Friday | Snow | Night time and street lights absent | Fog or Mist | 0.431 | high |
| Friday | Frost or Ice | Night time and street lights absent | Fog or Mist | 0.387 | high |
| Friday | Flood over 3 cm | Night time and street lights absent | Fog or Mist | 0.306 | high |

TABLE 7

| Lookup table for Severity Level (Monday) | | | | | |
|---|---|---|---|---|---|
| Day | Road surface condition | Light condition | Weather condition | Severity Index | Severity level of possible crash |
| Monday | Dry | Daylight | Fine and no high winds | −0.119 | moderate |
| Monday | Wet or Damp | Daylight | Fine and no high winds | −0.158 | moderate |
| Monday | Snow | Daylight | Fine and no high winds | −0.323 | low |
| Monday | Frost or Ice | Daylight | Fine and no high winds | −0.379 | very low |
| Monday | Flood over 3 cm | Daylight | Fine and no high winds | −0.409 | very low |
| Monday | Dry | Night time and street lights lit | Fine and no high winds | 0.259 | high |
| Monday | Wet or Damp | Night time and street lights lit | Fine and no high winds | 0.259 | high |
| Monday | Snow | Night time and street lights lit | Fine and no high winds | 0.094 | moderate |
| Monday | Frost or Ice | Night time and street lights lit | Fine and no high winds | −0.034 | moderate |
| Monday | Flood over 3 cm | Night time and street lights lit | Fine and no high winds | −0.179 | low |

TABLE 7-continued

Lookup table for Severity Level (Monday)

| Day | Road surface condition | Light condition | Weather condition | Severity Index | Severity level of possible crash |
|---|---|---|---|---|---|
| Monday | Dry | Night time and street lights unlit | Fine and no high winds | 0.592 | very high |
| Monday | Wet or Damp | Night time and street lights unlit | Fine and no high winds | 0.591 | very high |
| Monday | Snow | Night time and street lights unlit | Fine and no high winds | 0.440 | high |
| Monday | Frost or Ice | Night time and street lights unlit | Fine and no high winds | 0.392 | high |
| Monday | Flood over 3 cm | Night time and street lights unlit | Fine and no high winds | 0.272 | high |
| Monday | Dry | Night time and street lights absent | Fine and no high winds | 0.691 | very high |
| Monday | Wet or Damp | Night time and street lights absent | Fine and no high winds | 0.683 | very high |
| Monday | Snow | Night time and street lights absent | Fine and no high winds | 0.668 | very high |
| Monday | Frost or Ice | Night time and street lights absent | Fine and no high winds | 0.557 | very high |
| Monday | Flood over 3 cm | Night time and street lights absent | Fine and no high winds | 0.495 | very high |
| Monday | Dry | Daylight | Raining no high winds | −0.150 | moderate |
| Monday | Wet or Damp | Daylight | Raining no high winds | −0.291 | low |
| Monday | Snow | Daylight | Raining no high winds | −0.366 | low |
| Monday | Frost or Ice | Daylight | Raining no high winds | −0.393 | very low |
| Monday | Flood over 3 cm | Daylight | Raining no high winds | −0.425 | very low |
| Monday | Dry | Night time and street lights absent | Raining no high winds | 0.676 | very high |
| Monday | Wet or Damp | Night time and street lights absent | Raining no high winds | 0.673 | very high |
| Monday | Snow | Night time and street lights absent | Raining no high winds | 0.542 | very high |
| Monday | Frost or Ice | Night time and street lights absent | Raining no high winds | 0.520 | very high |
| Monday | Flood over 3 cm | Night time and street lights absent | Raining no high winds | 0.472 | very high |
| Monday | Dry | Night time and street lights lit | Snow and no high winds | 0.165 | moderate |
| Monday | Wet or Damp | Night time and street lights lit | Snow and no high winds | 0.077 | moderate |
| Monday | Snow | Night time and street lights lit | Snow and no high winds | 0.009 | moderate |
| Monday | Frost or Ice | Night time and street lights lit | Snow and no high winds | −0.132 | moderate |
| Monday | Flood over 3 cm | Night time and street lights lit | Snow and no high winds | −0.234 | low |
| Monday | Dry | Night time and street lights absent | Fine with high winds | 0.650 | very high |
| Monday | Wet or Damp | Night time and street lights absent | Fine with high winds | 0.620 | very high |
| Monday | Snow | Night time and street lights absent | Fine with high winds | 0.505 | very high |
| Monday | Frost or Ice | Night time and street lights absent | Fine with high winds | 0.448 | high |

TABLE 7-continued

Lookup table for Severity Level (Monday)

| Day | Road surface condition | Light condition | Weather condition | Severity Index | Severity level of possible crash |
|---|---|---|---|---|---|
| Monday | Flood over 3 cm | Night time and street lights absent | Fine with high winds | 0.396 | high |
| Monday | Dry | Daylight | Raining with high winds | −0.224 | low |
| Monday | Wet or Damp | Daylight | Raining with high winds | −0.396 | very low |
| Monday | Snow | Daylight | Raining with high winds | −0.430 | very low |
| Monday | Frost or Ice | Daylight | Raining with high winds | −0.453 | very low |
| Monday | Flood over 3 cm | Daylight | Raining with high winds | −0.490 | very low |

Based on these look up tables, the level of severity for a possible crash is calculated. It is observed that the crashes are more severe on dry road surface in comparison with wet surface although the difference was not substantial. It is also evident from the results that the crashes occurring during night time when there is darkness and in the absence of street lighting are highly severe under any conditions. The results of these look-up tables may be extended to all the possible combinations and fed into the memory 152. Then, based on the weather forecast database 146, and street light database 144, the relative severity is determined from these tables. With the advent of Internet of Things (IoT), many devices and sensors are interconnected through the internet, and online data about these devices and sensors may be retrieved from central database management systems. Since these results are generated based on the aforementioned dataset of six years from Great Britain having a large number of conditions, the results of this model are highly reliable. The system and methods may be implemented into the real time traffic crash severity indication tool that can be extended to any country by using the crash dataset for that country. In the situation in which there is not enough data for the country, the disclosure may be applied to available data, for example, to a specific county or city, where enough data is available.

Figure 6:
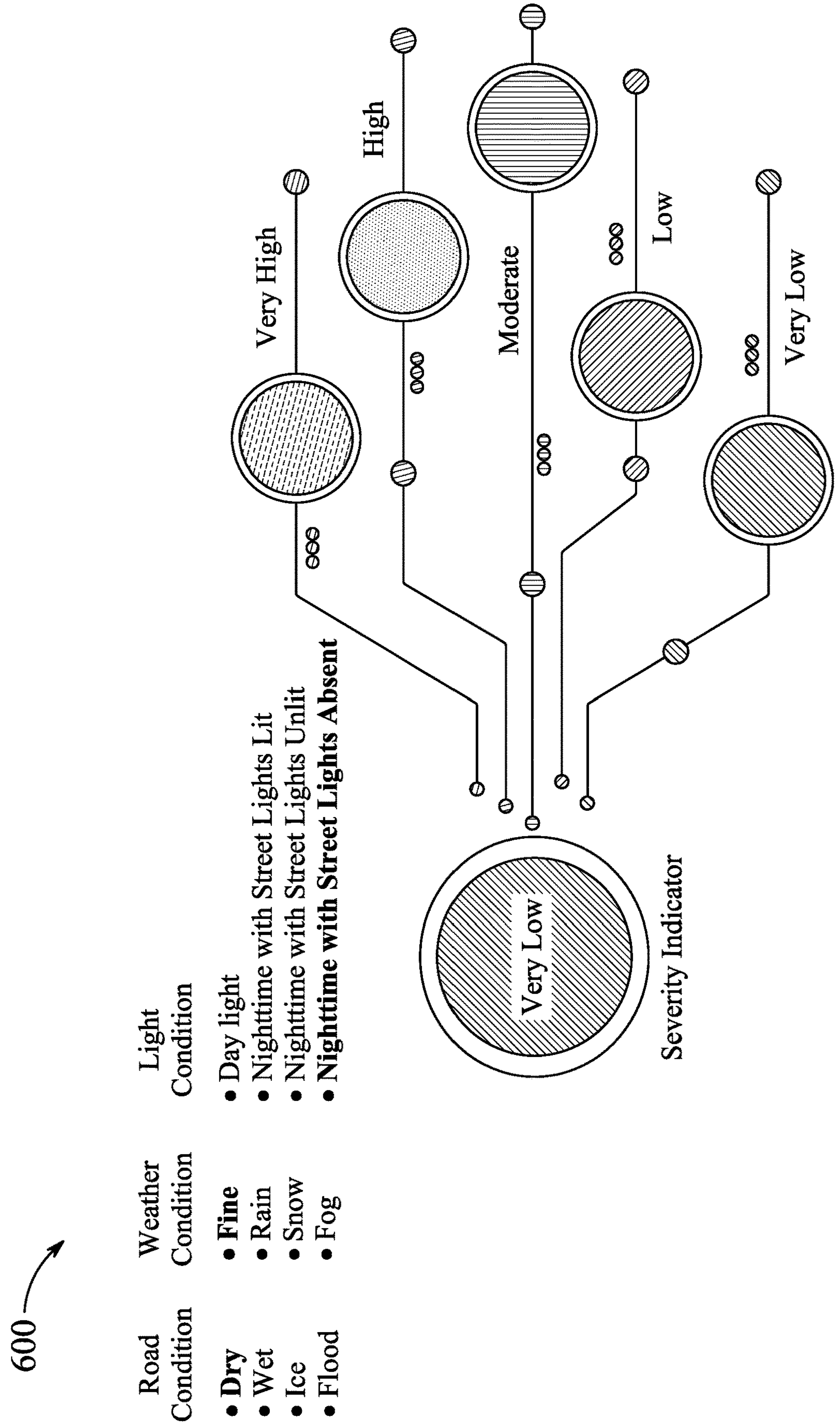
FIG. 6 illustrates a relative severity indicator interface, according to certain embodiments.

An exemplary result which may be provided on the display 116 is shown in FIG. 6. FIG. 6 shows a severity indicator interface which illustrates the current condition of three main exogenous features, that is, the road condition, the weather condition, and the light condition on the display 116. The native crash severity computer application 130 may be initiated. In some examples, the native crash severity computer application 130 may be auto-initiated when the vehicle 102 is started. The native crash severity computer application 130 may connect with the crash severity prediction computer application 104 through the network 106 to obtain information such as weather conditions and road surface conditions. The weather forecast database 146 may provide weather conditions. The street light database 144 may provide information on presence or absence of the streetlights on a specific route. Based at least on the weather conditions and information on presence or absence of the streetlights on a specific route, the real time traffic crash severity indication tool provides the crash severity level based on data fed into the system with the different possible combinations of the exogenous factors. The crash severity level for a possible crash under current conditions is represented in the interface with a big circle including text and shade. The right slanting shade is used to indicate low level crash severity, left shading is used for indicating low level crash severity, straight shading for moderate level crash severity, dotted shading for high severity, and dashed shading for very high severity. This interface is user friendly and easily understandable for a non-technical person (drivers).

Figure 7:
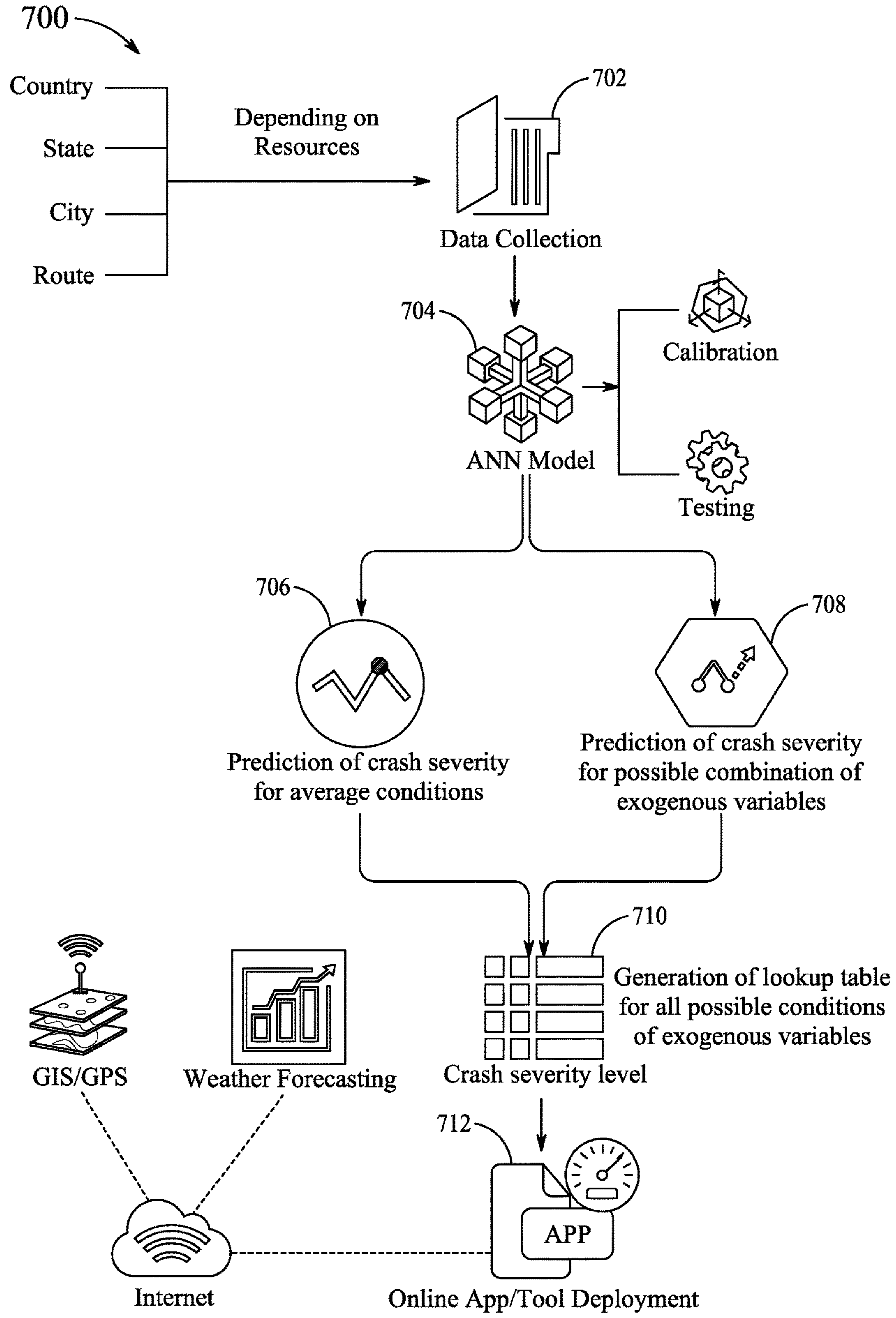
FIG. 7 illustrates a tool deployment flow for the native crash severity computer application tool, according to certain embodiments.

The native crash severity computer application 130 may be used in any developed country when trained using historic crash data for each country. FIG. 7 illustrates a tool deployment flow for the real time traffic crash severity indication tool. Depending on the availability of resources and requirements of drivers, in step 702, crash data may be collected for a whole country, state, city and/or a specific route. Based on the collected data, in step 704, the trained ANN model 148 is recalibrated and tested. In step 706, crash severity for an average condition may be predicted. In step 708, crash severity for a possible combination of exogenous variables may be predicted. In step 710, lookup tables may be generated for all the possible combinations of exogenous variables as described earlier (for example, as shown in Table 5, Table 6, and Table 7). In step 712, the native crash severity computer application tool can be deployed with the generation of lookup tables. If the data is collected for a given country, the crash severity prediction computer application 104 on the cloud services 108 may update the native crash severity computer application 130 with the data. In another example, if the data is collected for a given country, the real time traffic crash severity indication tool may be launched and deployed across the given country. In case the crash data for the whole country is not available, the real time traffic crash severity indication tool can be used for the dataset of a state, city or a specific route.

Figure 8:
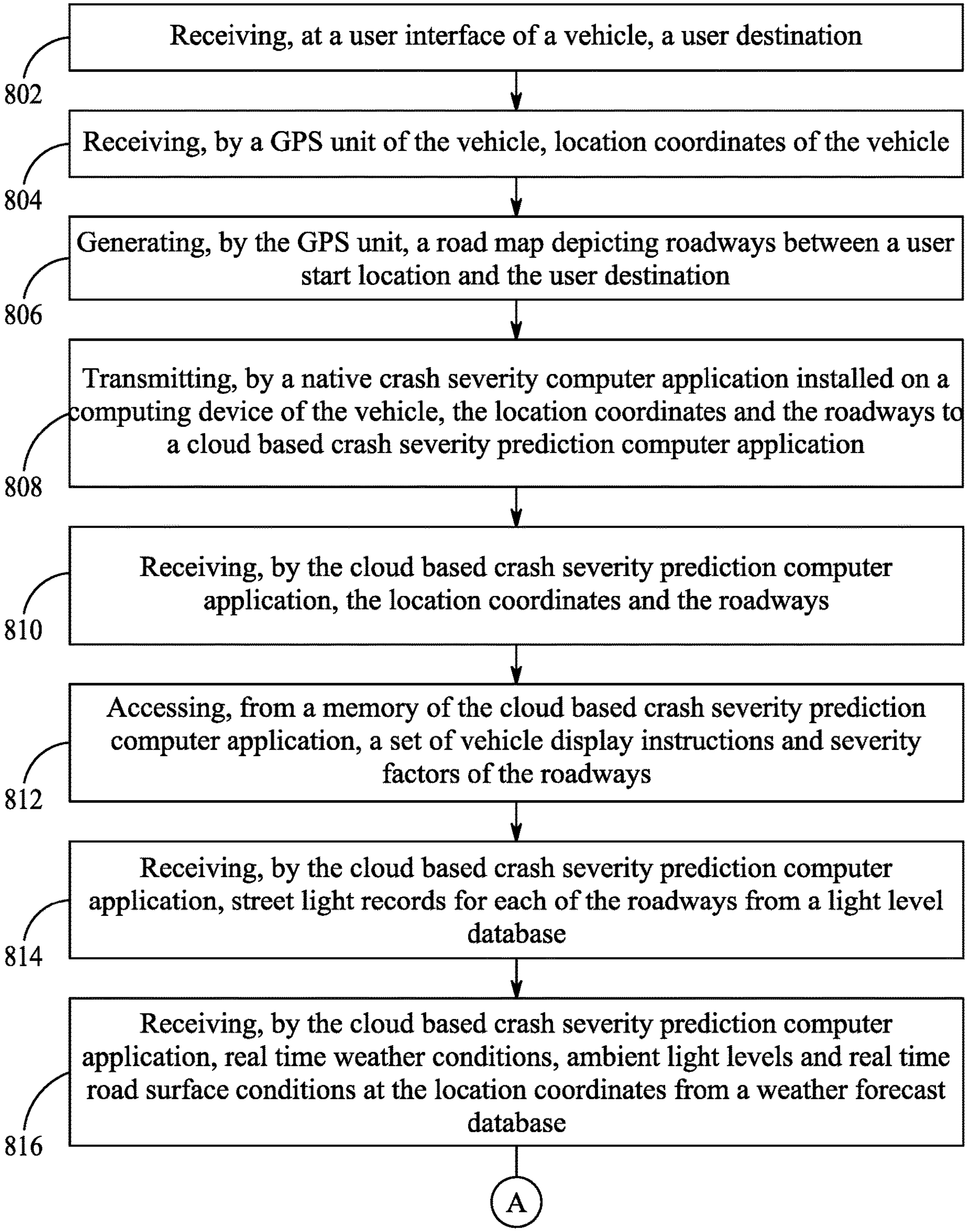
FIG. 8 illustrates a process flow for predicting real time crash severity, according to certain embodiments.
Figure 8:
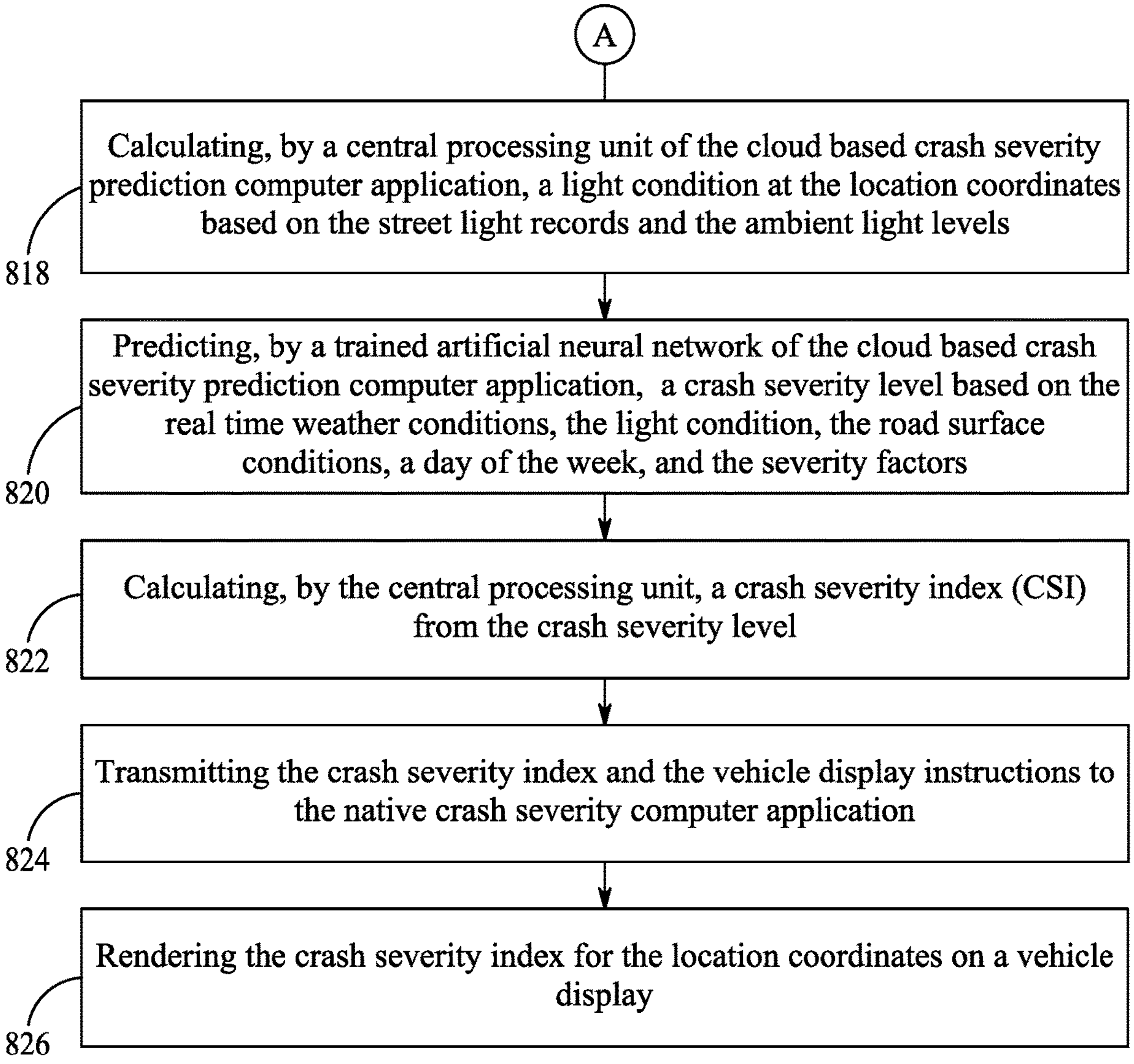

FIG. 8 illustrates a process flow for predicting real time crash severity. Step 802 includes receiving, at the user interface 112 of the vehicle 102, a user destination. Step 804 includes receiving, by the GPS unit 114 of the vehicle 102, location coordinates of the vehicle 102. Step 806 includes generating, by the GPS unit 114, a road map depicting roadways between a user start location and the user destination. Step 808 includes transmitting, by the native crash severity computer application 130 installed on the computing device 120 of the vehicle 102, the location coordinates and the roadways to the cloud based crash severity prediction computer application 104. Step 810 includes receiving, by the cloud based crash severity prediction computer application 104, the location coordinates and the roadways. Step 812 includes accessing, from a memory of the cloud based crash severity prediction computer application 104, a set of vehicle display instructions and severity factors of the roadways. Step 814 includes receiving, by the cloud based crash severity prediction computer application 104, street light records for each of the roadways from a street light database. Step 816 includes receiving, by the cloud based crash severity prediction computer application 104, real time weather conditions, ambient light levels and real time road surface conditions at the location coordinates from a weather forecast database. Step 818 includes calculating, by the central processing unit 142 of the cloud based crash severity prediction computer application 104, a light condition at the location coordinates based on the street light records and the ambient light levels. Step 820 includes predicting, by the trained ANN 148 of the cloud based crash severity prediction computer application 104, a crash severity level based on the real time weather conditions, the light condition, the road surface conditions, a day of the week, and the severity factors. Step 822 includes calculating, by the central processing unit 142, the CSI from the crash severity level. Step 824 includes transmitting the CSI and the vehicle display instructions to the native crash severity computer application 130. Step 826 includes rendering the CSI for the location coordinates on the vehicle display 116.

The native crash severity computer application 130 may be initiated by the user. In some examples, the native crash severity computer application 130 may be auto-initiated when the vehicle 102 is started, and may connect with the internet. The GPS unit 114 may obtain location coordinates of a current location of the vehicle 102. The computing device 120 may generate a screen on the user interface 112 to prompt the user to provide a user destination. The user may provide a location on the user interface 112. The GPS unit 114 may receive the user input and determine the location coordinates of the user destination. The GPS unit 114 may obtain and show a road map depicting one or more roadways between a user start location and the user destination. The user may be prompted to choose one of the roadways for travel. The native crash severity computer application 130 may connect with the crash severity prediction computer application 104 through the network 106. The native crash severity computer application 130 may collect and communicate the road map depicting one or more roadways to the crash severity prediction computer application 104. The crash severity prediction computer application 104 may obtain information such as weather conditions (for example, the weather forecast database 146) and road surface conditions associated with the one or more roadways. The crash severity prediction computer application 104 may also obtain information on presence or absence of the streetlights on the one or more roadways (through the street light database 144). Based at least on the weather conditions and information on presence or absence of the streetlights on a specific route, the crash severity prediction computer application 104 provides the crash severity level based on data and all the different possible combinations for the exogenous factors. The crash severity prediction computer application 104 may consider possible positions of the user/vehicle on the route and identify the crash severity level at those positions around approximated times. The crash severity prediction computer application 104 may calculate the CSI from the crash severity level and transmit the crash severity index and the vehicle display instructions to the native crash severity computer application 120. The native crash severity computer application 130 renders the crash severity index on the display 116.

In some situations, the weather and road conditions may suddenly change. For example, there may be heavy rains, snow falls, cloud bursts, flash floods, sand storms, tornadoes, road blocks and such incidents, that may change the crash severity levels. The tool provided by the native crash severity computer application 130 in conjunction with the crash severity prediction computer application 104 monitors the roadways continuously and prompts the user on changes and warns of risks travelling on a chosen route and may prompt the user to choose a roadway that is safer compared to the current route.

The first embodiment is illustrated with respect to FIGS. 1-12. The first embodiment describes the real time crash severity prediction system 100. The real time crash severity prediction system 100 includes the vehicle 102. The vehicle 102 includes the user interface 112 configured to receive a user destination, a GPS unit configured to generate location coordinates of the vehicle 102 and show a road map depicting roadways between a user start location and the user destination, the display 116, the communications device 118, the computing device 120 operatively connected to the GPS unit 114, the display 116 and the communications device 118, the computing device 120 including circuitry 122, the computer-readable medium 124 configured to store first program instructions 128 including the native crash severity computer application 130, and at least one first processor 126 configured to execute the first program instructions 128, the crash severity prediction computer application 104 communicably connected to the native crash severity computer application 130, the crash severity prediction computer application 104 configured to receive the location coordinates and the road map, wherein the crash severity prediction computer application 104 is operatively connected to cloud services 108 including: the central processing unit 142 including the memory 152 configured to store the location coordinates and the road map, a set of vehicle display instructions, severity factors, and second program instructions 154, the street light database 144 configured with street light records for each of the roadways, the weather forecast database 146 configured with real time weather conditions including ambient light levels, and real time road surface conditions at the location coordinates, wherein the central processing unit 142 is configured to calculate a light condition at the location coordinates based on the street light records and the ambient light levels, the trained ANN 148, wherein the trained ANN 148 is configured to predict a crash severity level based on the real time weather conditions, the light condition, the road surface conditions, a day of the week, and the severity factors, wherein the central processing unit 142 is configured to calculate the CSI from the crash severity level and transmit the CSI and the vehicle display instructions to the native crash severity computer application 130, and wherein the native crash severity computer application 130 is configured to render the CSI on the display 116.

The display 116 is at least one of a windshield projection display, a dashboard instrument panel, and a console display unit.

The light condition is one of daylight, night time and street lights lit, night time and street lights unlit, and night time and street lights absent.

The road surface condition includes one of a dry, one of wet and damp, snow covered, one of frost and ice covered, and flooded more than 3 centimeters deep.

The real time weather conditions are one of no precipitation and wind speed less than or equal to 8 m/s, rain and wind speed less than 8 m/s, snow and wind speed less than 8 m/s, no precipitation and wind speed greater than 8 m/s, rain and wind speed greater than 8 m/s, snow and wind speed greater than 8 m/s, and one of foggy and misty.

The severity factors include a number of vehicles involved in a crash, a road material type, wherein the road material type includes one or more of concrete, asphalt, gravel, earth, mixed rock fragments, and bitumen, a road class, wherein the road class includes any of an expressway, an interstate highway, a six lane road, a four lane road, and a two lane road, a speed limit at the location coordinates, an area type, wherein the area type includes any of a rural area, a city area, and a suburban area, an intersection type, wherein the intersection type includes one of a four way intersection, a three way intersection, a Y-intersection, a traffic circle, and a T-intersection, an intersection control, wherein the intersection control includes one or more of a traffic signal, one or more stop signs, and an intersection with no traffic guidance, and a vehicle type, wherein the vehicle type includes one of a sedan, a coupe, a sports car, a station wagon, a sports utility vehicle, a pick-up truck, a tractor-trailer, and a van. Each severity level is defined by a percentage of crashes on the roadways, wherein the severity levels are one of a very low severity of less than or equal to 30% crashes, low severity in a range of 30% to 40% crashes, moderate severity in a range of 40% to 60% crashes, high severity in a range of 60% to 70% crashes, and very high severity for crashes greater than or equal to 70%.

The artificial neural network is trained on a dataset of historical crash statistics for the roadways, and the artificial neural network is configured to generate clusters of the severity levels of the crashes.

The central processing unit 142 is configured to calculate the CSI based on:

$$CSI = \frac{PSCAC - PSCGC}{PSCAC},$$

where PSCAC is a percentage of severe crashes for base conditions, and PSCGC is a percentage of severe crashes for the real time weather condition, the light condition, and the road surface condition at the location coordinates.

The central processing unit 142 is configured to generate a look-up table of the crash severity indices and transmits the look-up table to the native crash severity computer application 130.

The native crash severity computer application 130 is configured to display the CSI for each roadway on the road map.

The native crash severity computer application 130 is configured to display the crash severity index related to the location coordinates on the display 116.

The second embodiment is illustrated with respect to FIGS. 1-12. The second embodiment describes a method for predicting real time crash severity is disclosed. The method includes receiving, at the user interface 112 of the vehicle 102, a user destination, receiving, by the GPS unit 114 of the vehicle, location coordinates of the vehicle, generating, by the GPS unit 114, a road map depicting roadways between a user start location and the user destination, transmitting, by the native crash severity computer application 130 installed on the computing device 120 of the vehicle 102, the location coordinates and the roadways to the cloud based crash severity prediction computer application 104, receiving, by the cloud based crash severity prediction computer application 104, the location coordinates and the roadways, accessing, from a memory of the cloud based crash severity prediction computer application 104, the set of vehicle display instructions and severity factors of the roadways, receiving, by the cloud based crash severity prediction computer application 104, street light records for each of the roadways from a street light database, wherein the street light records indicate whether the street lights are lit or unlit, receiving, by the cloud based crash severity prediction computer application 104, real time weather conditions, ambient light levels and real time road surface conditions at the location coordinates from a weather forecast database, calculating, by the central processing unit 142 of the cloud based crash severity prediction computer application 104, a light condition at the location coordinates based on the street light records and the ambient light levels, predicting, by the trained ANN 148 of the cloud based crash severity prediction computer application 104, a crash severity level based on the real time weather conditions, the light condition, the road surface conditions, a day of the week, and the severity factors, calculating, by the central processing unit, the CSI from the crash severity level, transmitting the crash severity index and the vehicle display instructions to the native crash severity computer application 130, and rendering the CSI for the location coordinates on a vehicle display 116.

The method includes training the artificial neural network on a dataset of historical crash statistics for the roadways.

The method includes generating, by the artificial neural network, clusters of the severity levels of the crashes.

The method includes calculating, by the central processing unit, a crash severity index (CSI) based on:

$$CSI = \frac{PSCAC - PSCGC}{PSCAC},$$

where PSCAC is a percentage of severe crashes for base conditions, and PSCGC is a percentage of severe crashes for the real time weather condition, the light condition, and the road surface condition at the location coordinates.

The method includes generating, by the central processing unit 142, a look-up table of the crash severity indices, and transmitting the look-up table to the native crash severity computer application 130.

The method includes matching a record in the look-up table with the location coordinates for the day of the week to retrieve the crash severity index.

The method includes matching a record in the look-up table with each roadway, retrieving a CSI for each roadway, and showing the CSI for each roadway on the road map.

The third embodiment is illustrated with respect to FIGS. 1-12. The third embodiment describes a non-transitory computer readable medium having instructions stored therein that, when executed by one or more processors, cause the one or more processors to perform a method for predicting real time crash severity. The method includes receiving, at the user interface 112 of a vehicle, a user destination, receiving, by the GPS unit 114 of the vehicle 102, location coordinates of the vehicle 102, generating, by the GPS unit 114, a road map depicting roadways between a user start location and the user destination, transmitting, by the native crash severity computer application 130 stored in the program instructions of the vehicle 102, the location coordinates and the roadways to the cloud based crash severity prediction computer application 104, receiving, by the cloud based crash severity prediction computer application 104, the location coordinates and the roadways, accessing, from a memory 152 of the cloud based crash severity prediction computer application 104, a set of vehicle display instructions and severity factors of the roadways, receiving, by the cloud based crash severity prediction computer application 104, street light records for each of the roadways from a street light database, wherein the street light records indicate whether the street lights are lit or unlit, receiving, by the cloud based crash severity prediction computer application 104, real time weather conditions, ambient light levels and real time road surface conditions at the location coordinates from a weather forecast database, calculating, by the central processing unit 142 of the cloud based crash severity prediction computer application, a light condition at the location coordinates based on the street light records and the ambient light levels, predicting, by a trained ANN 148 of the cloud based crash severity prediction computer application 104, a crash severity level based on the real time weather conditions, the light condition, the road surface conditions, a day of the week, and the severity factors, calculating, by the central processing unit 142, a CSI from the crash severity level, transmitting the crash severity index and the vehicle display instructions to the native crash severity computer application 130, receiving, by the native crash severity computer application 130, the crash severity index and the vehicle display instructions, and rendering the CSI for the location coordinates on a vehicle display 116.

Next, further details of the hardware description of the computing environment of FIG. 1 according to exemplary embodiments is described with reference to FIG. 9. In FIG. 1, a controller 1000 is described is representative of the system 90 of FIG. 1 in which the controller is the computing device 110 and central processing unit 142, each of which includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 10, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

Figure 9:
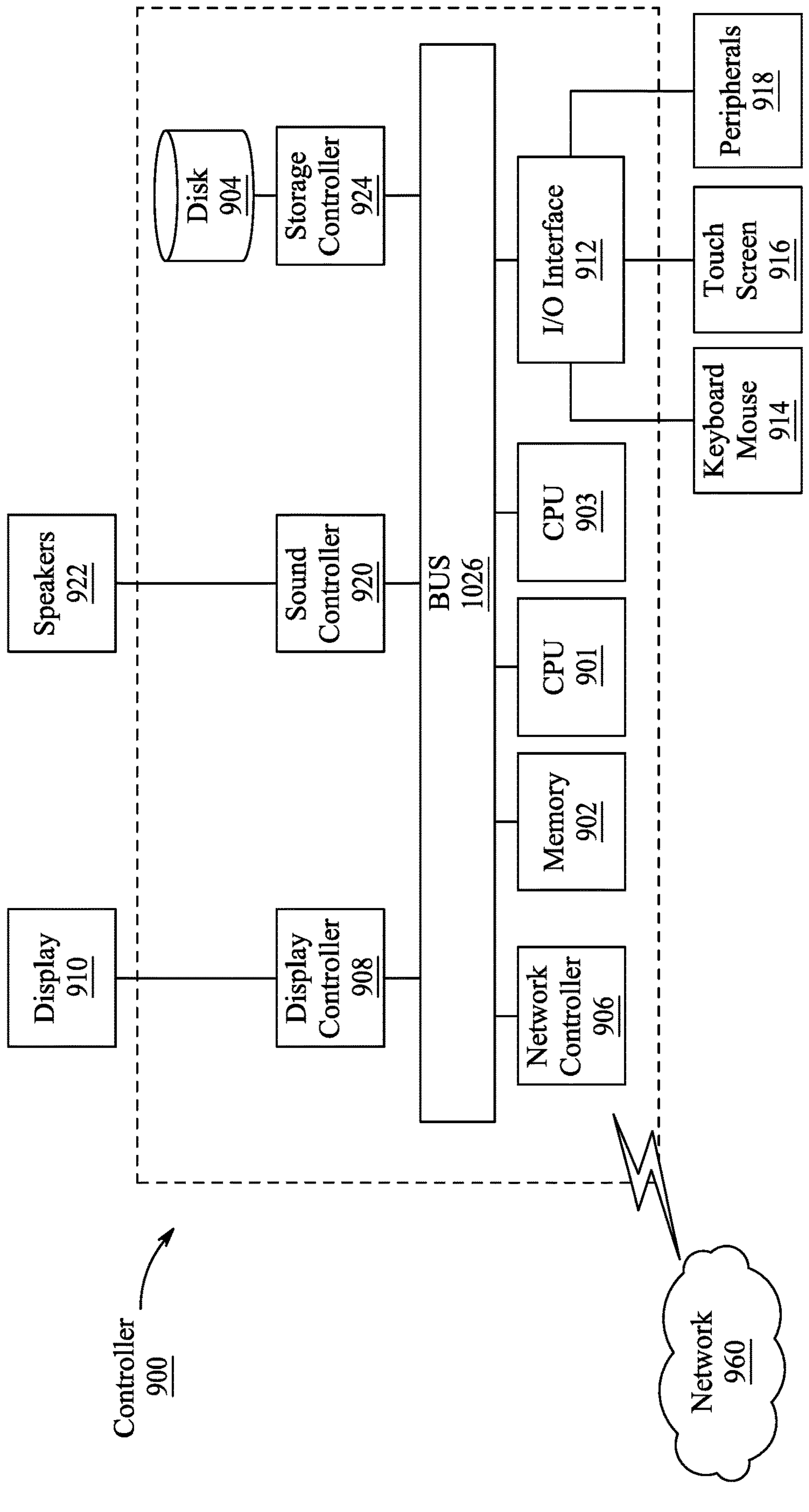
FIG. 9 is an illustration of a non-limiting example of details of computing hardware used in the computing device, according to aspects of the present disclosure.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
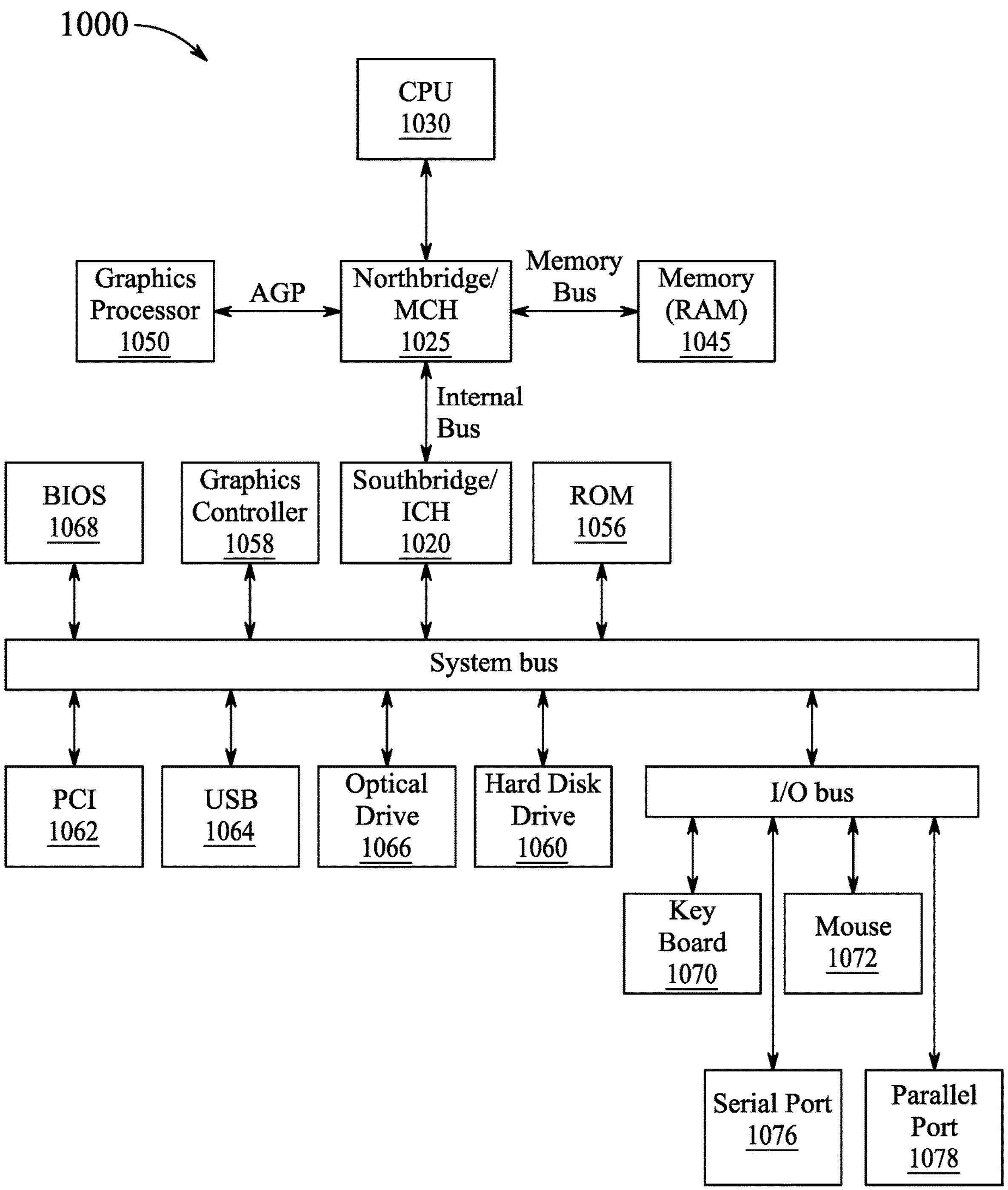
FIG. 10 is an exemplary schematic diagram of a data processing system used within the computing device, according to aspects of the present disclosure.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
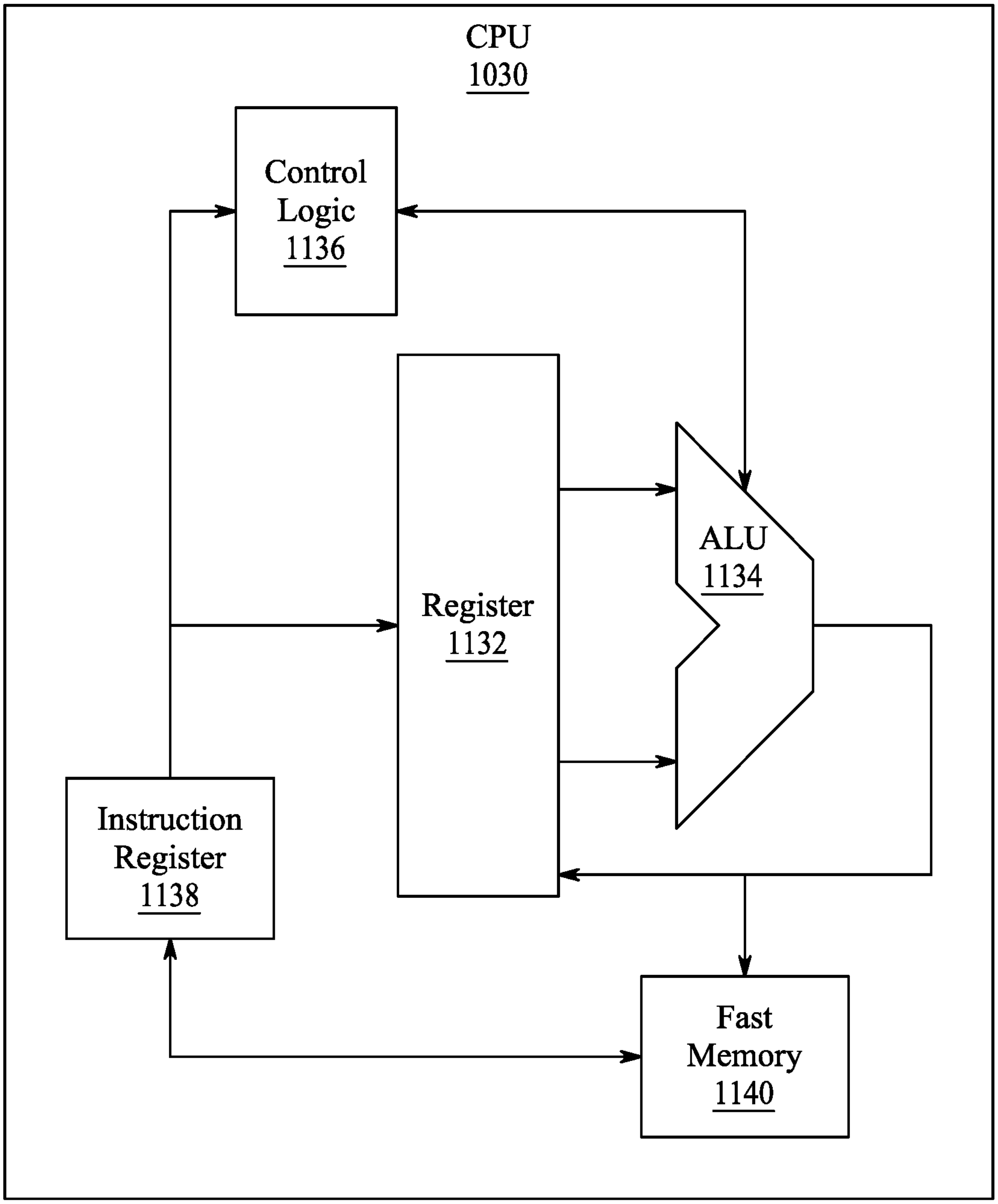
FIG. 11 is an exemplary schematic diagram of a processor used with the computing device, according to aspects of the present disclosure.
Figure 12:
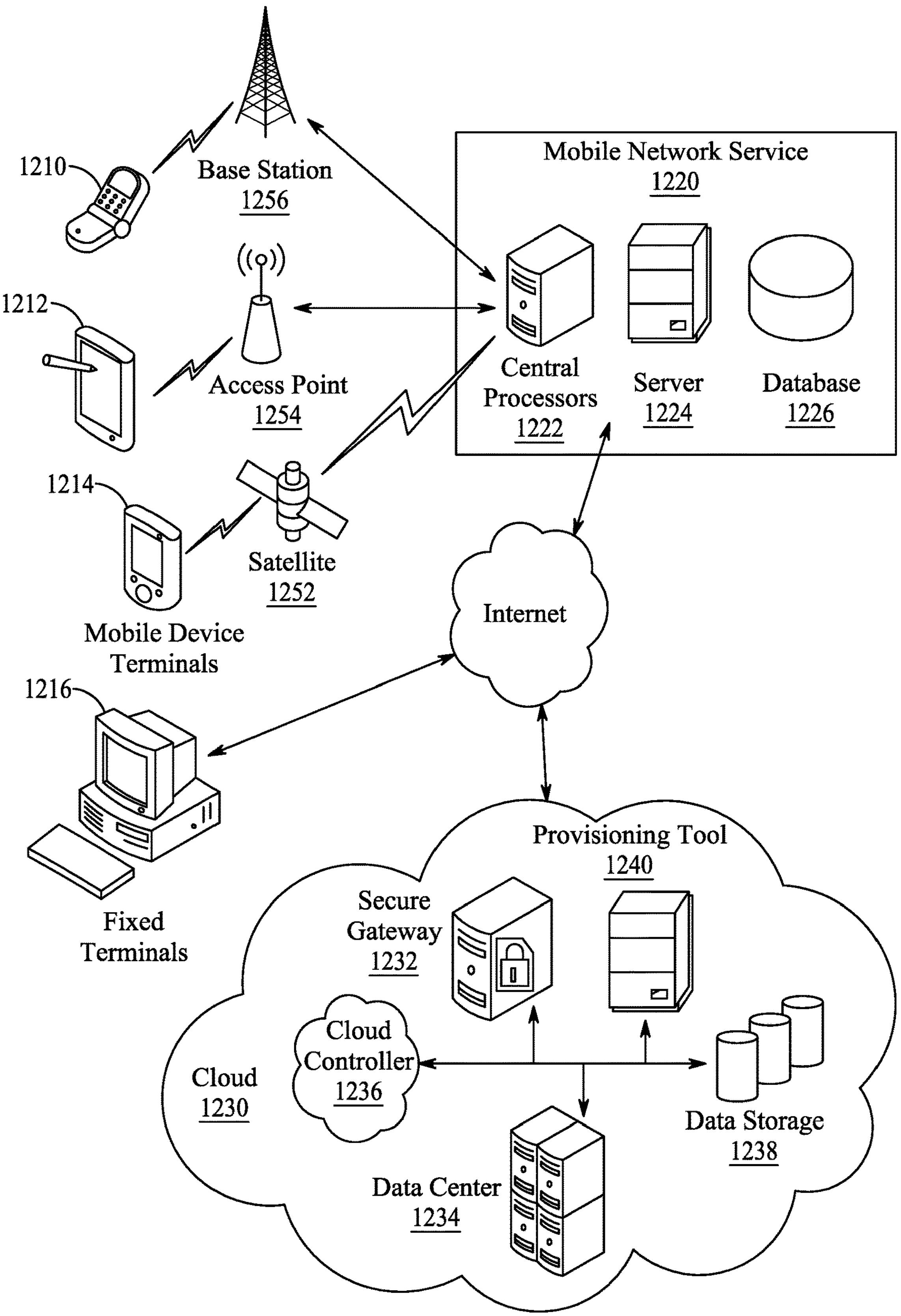
FIG. 12 is an illustration of a non-limiting example of distributed components that may share processing with the controller, according to aspects of the present disclosure.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1130. Part of the instructions can also be directed to the register 1132. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1088 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 10100, a mouse 10102, a parallel port 10108, and a serial port 10106 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A real time crash severity prediction system, comprising:
- a vehicle including:
  - a user interface configured to receive a user destination;
  - a GPS unit configured to generate location coordinates of the vehicle and show a road map depicting roadways between a user start location and the user destination;
  - a display;
  - a communications device;
  - a computing device operatively connected to the GPS unit, the display and the communications device, the computing device including circuitry, a non-transitory computer-readable medium configured to store first program instructions including a native crash severity computer application, and at least one first processor configured to execute the first program instructions;
- a crash severity prediction computer application communicably connected to the native crash severity computer application, the crash severity prediction computer application configured to receive the location coordinates and the road map, wherein the crash severity prediction computer application is operatively connected to cloud services including:
  - a central processing unit including a memory configured to store the location coordinates and the road map, a set of vehicle display instructions, severity factors, and second program instructions;
  - a street light database configured with street light records for each of the roadways, wherein the street light records indicate whether the street lights are lit or unlit;
  - a weather forecast database configured with real time weather conditions, including ambient light levels, and real time road surface conditions at the location coordinates;
  - wherein the central processing unit is configured to calculate a light condition at the location coordinates based on the street light records and the ambient light levels;
  - a trained artificial neural network (ANN) configured to predict a crash severity level based on the real time weather conditions, the light condition, the road surface conditions, a day of the week, and the severity factors;
  - wherein the central processing unit is configured to calculate a crash severity index (CSI) from the crash severity level and transmit the crash severity index and the set of vehicle display instructions to the native crash severity computer application; and
- wherein the native crash severity computer application is configured to render the crash severity index on the display.

2. The real time crash severity prediction system of claim 1, wherein the display is at least one of a windshield projection display, a dashboard instrument panel and a console display unit.

3. The real time crash severity prediction system of claim 1, wherein the light condition is one of:
daylight;
night time and street lights lit;
night time and street lights unlit; and
night time and street lights absent.

4. The real time crash severity prediction system of claim 1, wherein the road surface condition is one of:
dry;
one of wet and damp;
snow covered;
one of frost and ice covered; and
flooded more than 3 centimeters deep.

5. The real time crash severity prediction system of claim 1, wherein the real time weather conditions are one of:
no precipitation and wind speed less than or equal to 8 m/s;
rain and wind speed less than 8 m/s;
snow and wind speed less than 8 m/s;
no precipitation and wind speed greater than 8 m/s;
rain and wind speed greater than 8 m/s;
snow and wind speed greater than 8 m/s; and
one of foggy and misty.

6. The real time crash severity prediction system of claim 1, wherein the severity factors include:
a number of vehicles involved in a crash;
a road material type, wherein the road material type includes one or more of concrete, asphalt, gravel, earth, mixed rock fragments, and bitumen;
a road class, wherein the road class includes any of an expressway, an interstate highway, a six lane road, a four lane road, and a two lane road;
a speed limit at the location coordinates;
an area type, wherein the area type includes any of a rural area, a city area, and a suburban area;
an intersection type, wherein the intersection type includes one of a four way intersection, a three way intersection, a Y-intersection, a traffic circle, and a T-intersection;
an intersection control, wherein the intersection control includes one or more of a traffic signal, one or more stop signs, and an intersection with no traffic guidance; and
a vehicle type, wherein the vehicle type includes one of a sedan, a coupe, a sports car, a station wagon, a sports utility vehicle, a pick-up truck, a tractor-trailer, and a van.

7. The real time crash severity prediction system of claim 1, wherein each severity level is defined by a percentage of crashes on the roadways, wherein the severity levels are one of:
very low severity of less than or equal to 30% crashes;
low severity in a range of 30% to 40% crashes;
moderate severity in a range of 40% to 60% crashes;
high severity in a range of 60% to 70% crashes: and
very high severity for crashes greater than or equal to 70%.

8. The real time crash severity prediction system of claim 1, wherein:
the artificial neural network is trained on a dataset of historical crash statistics for the roadways; and
the artificial neural network is configured to generate clusters of the severity levels of the crashes.

9. The real time crash severity prediction system of claim 8, wherein the central processing unit is configured to calculate the crash severity index (CSI) based on:

$$CSI = \frac{PSCAC - PSCGC}{PSCAC},$$

where PSCAC is a percentage of severe crashes for base conditions, and PSCGC is a percentage of severe crashes for the real time weather condition, the light condition, and the road surface condition at the location coordinates.

10. The real time crash severity prediction system of claim 9, wherein:
the central processing unit is configured to generate a look-up table of the crash severity indices and transmits the look-up table to the native crash severity application.

11. The real time crash severity prediction system of claim 10, wherein:
the native crash severity application is configured to display the crash severity index for each roadway on the road map.

12. The real time crash severity prediction system of claim 11, wherein:
the native crash severity application is configured to display the crash severity index related to the location coordinates on the display.

13. A method for predicting real time crash severity, comprising:
receiving, at a user interface of a vehicle, a user destination;
receiving, by a GPS unit of the vehicle, location coordinates of the vehicle;
generating, by the GPS unit, a road map depicting roadways between a user start location and the user destination;
transmitting, by a native crash severity computer application installed on a computing device of the vehicle, the location coordinates and the roadways to a cloud based crash severity prediction computer application;
receiving, by the cloud based crash severity prediction computer application, the location coordinates and the roadways;
accessing, from a memory of the cloud based crash severity prediction computer application, a set of vehicle display instructions and severity factors of the roadways;
receiving, by the cloud based crash severity prediction computer application, street light records for each of the roadways from a street light database, wherein the street light records indicate whether the street lights are lit or unlit;
receiving, by the cloud based crash severity prediction computer application, real time weather conditions, ambient light levels and real time road surface conditions at the location coordinates from a weather forecast database;
calculating, by a central processing unit of the cloud based crash severity prediction computer application, a light condition at the location coordinates based on the street light records and the ambient light levels;
predicting, by a trained artificial neural network of the cloud based crash severity prediction computer application, a crash severity level based on the real time weather conditions, the light condition, the road surface conditions, a day of the week, and the severity factors;

calculating, by the central processing unit, a crash severity index (CSI) from the crash severity level;

transmitting the crash severity index and the vehicle display instructions to the native crash severity computer application; and rendering the crash severity index for the location coordinates on a vehicle display.

14. The method of claim 13, further comprising:

training the artificial neural network on a dataset of historical crash statistics for the roadways.

15. The method of claim 14, further comprising:

generating, by the artificial neural network, clusters of the severity levels of the crashes.

16. The method of claim 15, further comprising:

calculating, by the central processing unit, a crash severity index, CSI, based on:

$$CSI = \frac{PSCAC - PSCGC}{PSCAC}$$

where PSCAC is a percentage of severe crashes for base conditions, and PSCGC is a percentage of severe crashes for the real time weather condition, the light condition, and the road surface condition at the location coordinates.

17. The method of claim 16, further comprising:

generating, by the central processing unit, a look-up table of the CSIs; and transmitting the look-up table to the native crash severity application.

18. The method of claim 17, further comprising:

matching a record in the look-up table with the location coordinates for the day of the week to retrieve the CSI.

19. The method of claim 17, further comprising:

matching a record in the look-up table with each roadway;

retrieving a CSI for each roadway; and showing the CSI for each roadway on the road map.

20. A non-transitory computer readable medium having program instructions stored therein that, when executed by one or more processors, cause the one or more processors to perform a method for predicting real time crash severity, comprising:

receiving, at a user interface of a vehicle, a user destination;

receiving, by a GPS unit of the vehicle, location coordinates of the vehicle;

generating, by the GPS unit, a road map depicting roadways between a user start location and the user destination;

transmitting, by a native crash severity computer application stored in the program instructions of the vehicle, the location coordinates and the roadways to a cloud based crash severity prediction computer application;

receiving, by the cloud based crash severity prediction computer application, the location coordinates and the roadways;

accessing, from a memory of the cloud based crash severity prediction computer application, a set of vehicle display instructions and severity factors of the roadways;

receiving, by the cloud based crash severity prediction computer application, street light records for each of the roadways from a street light database, wherein the street light records indicate whether the street lights are lit or unlit;

receiving, by the cloud based crash severity prediction computer application, real time weather conditions including ambient light levels and real time road surface conditions at the location coordinates from a weather forecast database;

calculating, by a central processing unit of the cloud based crash severity prediction computer application, a light condition at the location coordinates based on the street light records and the ambient light levels;

predicting, by a trained artificial neural network of the cloud based crash severity prediction computer application, a crash severity level based on the real time weather conditions, the light condition, the road surface conditions, a day of the week, and the severity factors;

calculating, by the central processing unit, a crash severity index from the crash severity level;

transmitting the crash severity index and the vehicle display instructions to the native crash severity computer application;

receiving, by the native crash severity computer application, the crash severity index and the vehicle display instructions; and rendering the crash severity index for the location coordinates on a vehicle display.

* * * * *